United States Patent
Del Castillo et al.

(10) Patent No.: US 6,281,939 B1
(45) Date of Patent: Aug. 28, 2001

(54) METHOD AND APPARATUS FOR DECODING DATA ENCODED IN THE HORIZONTAL OVERSCAN PORTION OF A VIDEO SIGNAL

(75) Inventors: Leonardo G. Del Castillo, Redmond; Douglas Beck, Kirkland, both of WA (US)

(73) Assignee: Microsoft Corporation, Redmond, WA (US)

( * ) Notice: Subject to any disclaimer, the term of this patent is extended or adjusted under 35 U.S.C. 154(b) by 0 days.

(21) Appl. No.: 09/191,400

(22) Filed: Nov. 12, 1998

(51) Int. Cl.$^7$ ...................................................... H04N 5/46
(52) U.S. Cl. ............................ 348/558; 348/479; 348/555
(58) Field of Search ..................... 348/554, 555, 348/557, 558, 473, 476, 479, 465; H04N 5/46

(56) References Cited

U.S. PATENT DOCUMENTS

| | | | |
|---|---|---|---|
| 5,255,097 | * 10/1993 | Spiero . | |
| 5,398,071 | * 3/1995 | Gove | 348/558 |
| 5,703,658 | * 12/1997 | Tsuru | 348/554 |
| 6,057,899 | * 5/2000 | Reitmeier | 348/555 |
| 6,072,532 | * 6/2000 | Chieh | 348/478 |

* cited by examiner

*Primary Examiner*—Sherrie Hsia
(74) *Attorney, Agent, or Firm*—John S. Pratt, Esq; Kilpatrick Stockton LLP

(57) ABSTRACT

A method and apparatus for decoding data encoded in the horizontal overscan portion of a video signal. A video data detector is configured to decode data encoded in a video signal in a first type of video signal format, such as NTSC. When the detector receives the video signal, it enters a "fast acquisition" loop in which it attempts to decode a sequence of valid data from several consecutive frames of the video signal. If the detector cannot decode a sequence of valid data from the consecutive frames of the video signal, the detector is reconfigured to decode data encoded in the video signal in a second type of video signal format, such as PAL. The detector then attempts to decode a sequence of valid data from the next several consecutive frames of the video signal. If the detector is unable to decode a sequence of valid data from the consecutive frames, the detector is reconfigured for the first type of video signal format and the above process repeats. If the detector decodes a sequence of valid data in the several consecutive frames of the video signal, the detector enters a "controlled persistence" loop. In the controlled persistence loop, the detector continues to decode data until it fails to decode valid data from a series of consecutive video frames. When the detector fails to decode data from a series of consecutive video frames, the detector reenters the fast acquisition loop.

19 Claims, 12 Drawing Sheets

CONFIGURATION OF WIRELESS MODULATOR

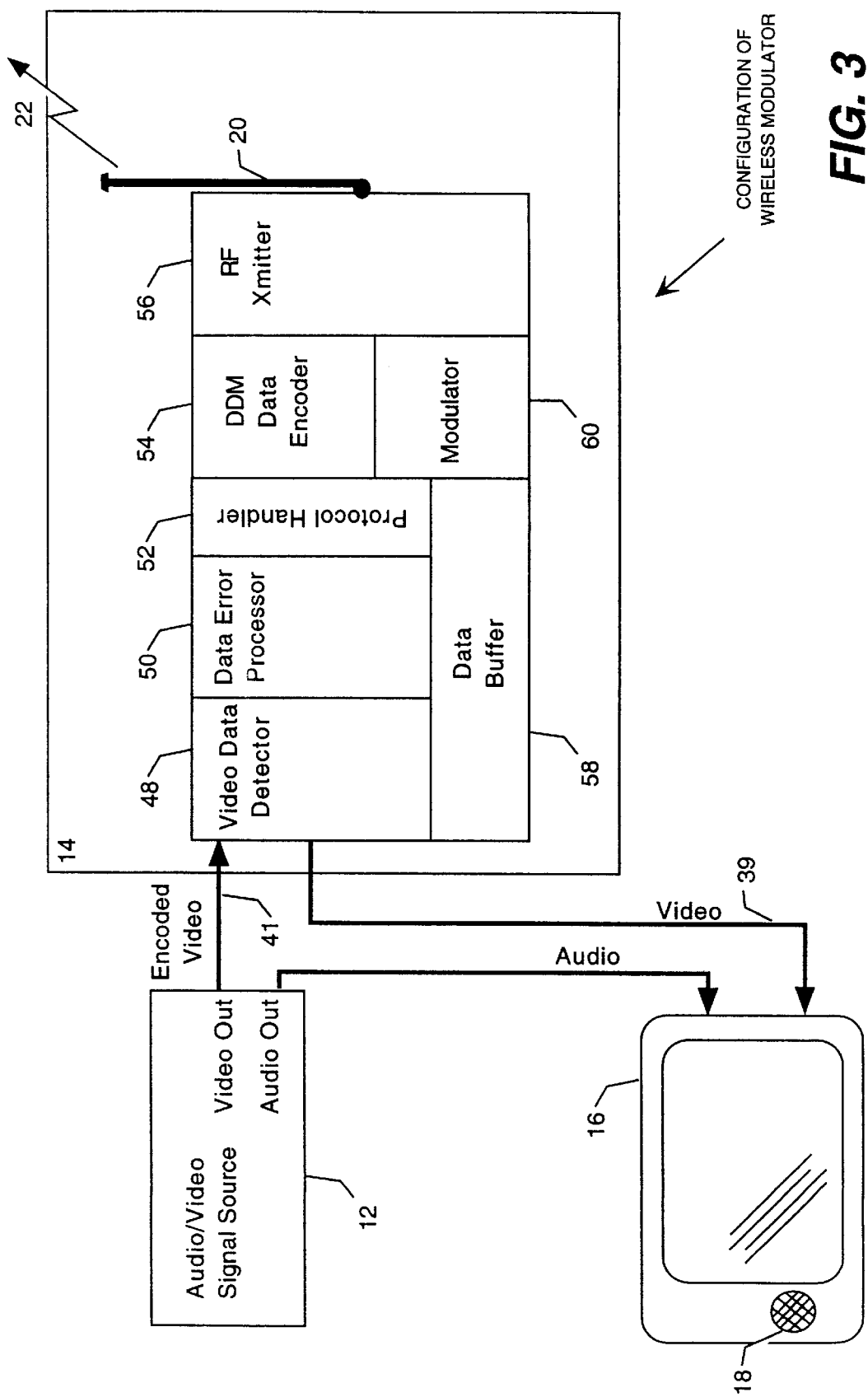

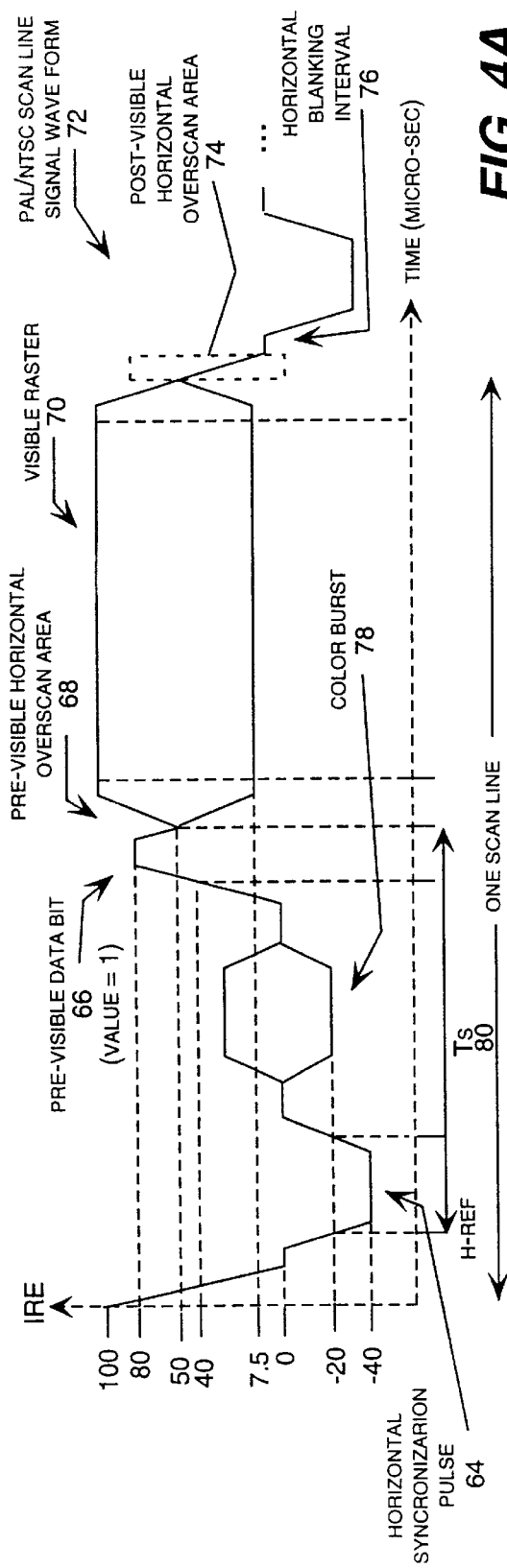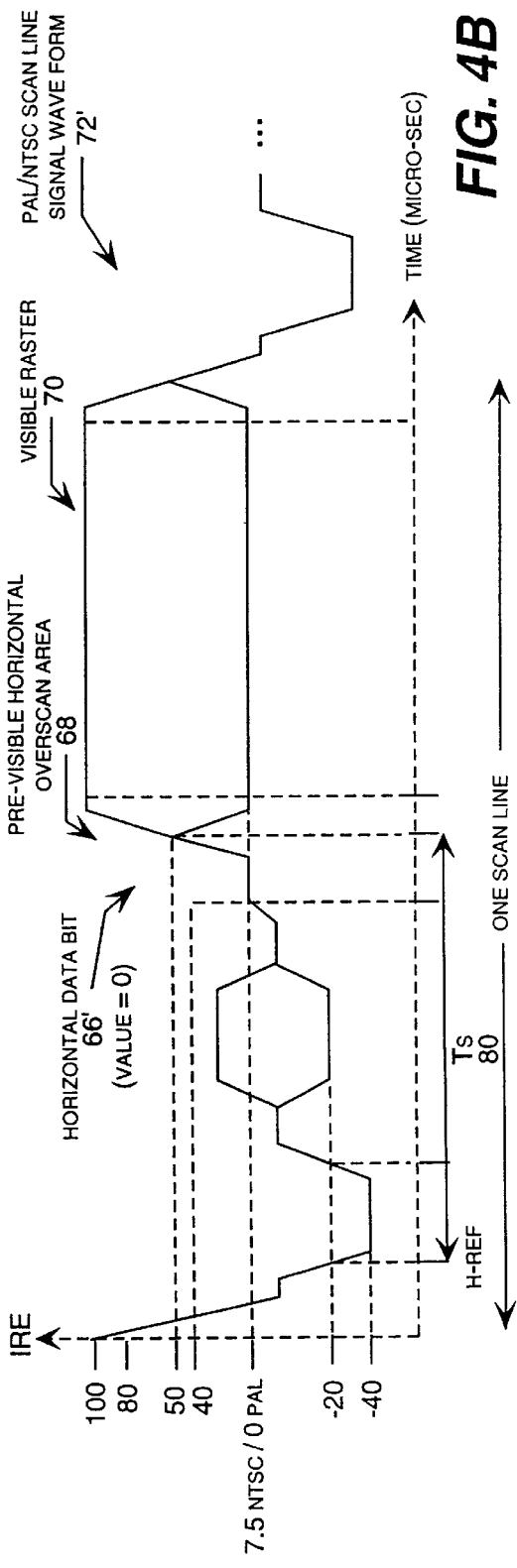

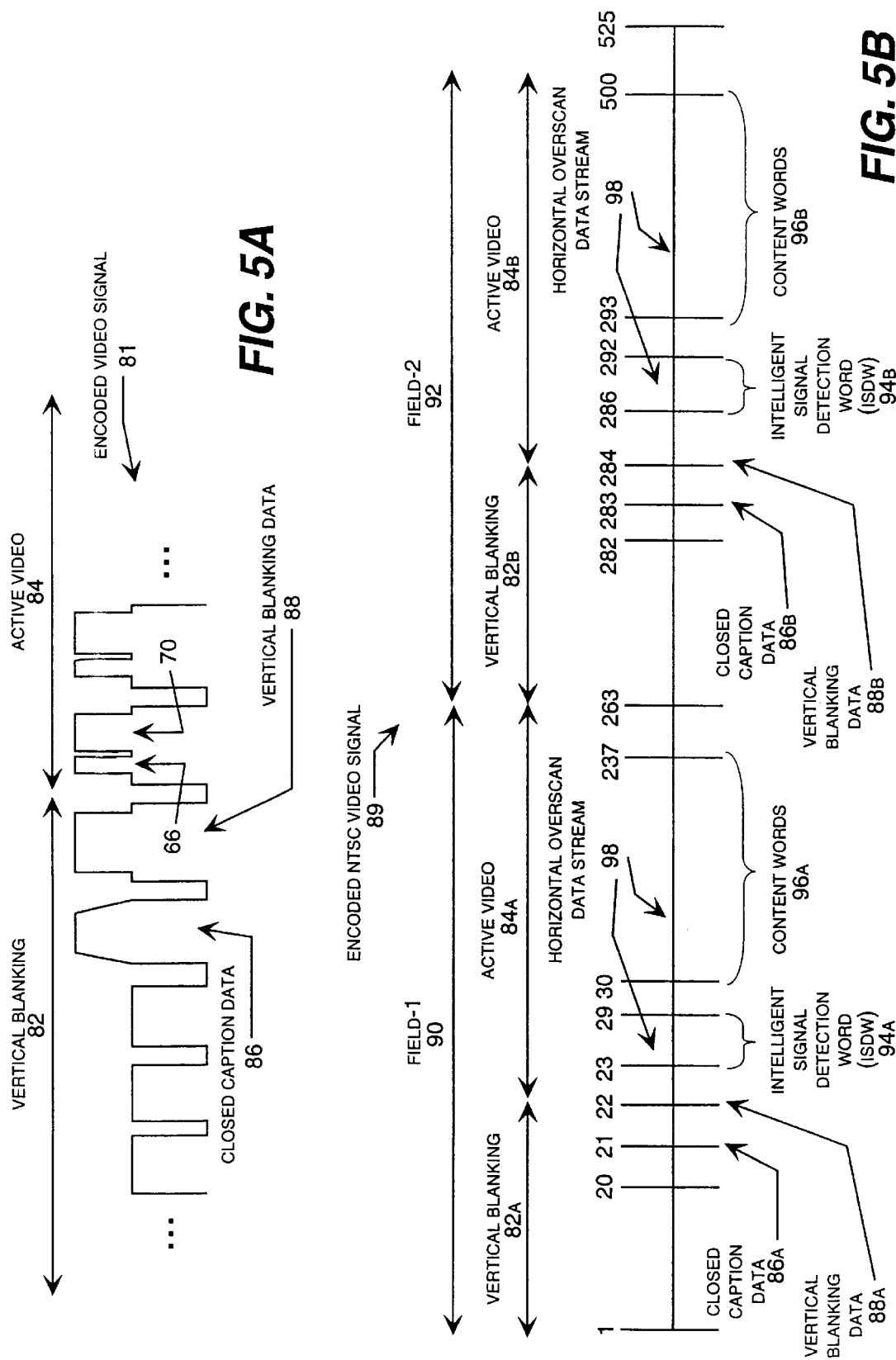

METHOD AND APPARATUS FOR DECODING DATA ENCODED IN THE HORIZONTAL OVERSCAN PORTION OF A VIDEO SIGNAL

REFERENCE TO RELATED APPLICATIONS

This application is related to U.S. application Ser. No. 08/885,385 entitled "METHOD AND SYSTEM FOR ENCODING DATA IN THE HORIZONTAL OVERSCAN PORTION OF A VIDEO SIGNAL" filed on Jun. 30, 1997 and U.S. application Ser. No. 08/795,710 entitled "PROTOCOL FOR A WIRELESS CONTROL SYSTEM" filed on Feb. 4, 1997.

TECHNICAL FIELD

The present invention relates to decoding data encoded in the horizontal overscan portion of a video signal, and, more particularly, relates to a method and apparatus for decoding data encoded in the horizontal overscan portion of video signals capable of adapting to varying transmission formats, including both NTSC and PAL.

BACKGROUND OF THE INVENTION

A number of different standards for transmitting video signals are currently used around the world. For example, the NTSC standard is currently used in North America and the PAL standard is currently used in Europe. The NTSC standard utilizes 525 horizontal lines of resolution per video frame and each video frame is updated 30 times per second. By contrast, the PAL standard utilizes 625 horizontal lines of resolution per video frame and each video frame is updated 25 times per second. Because of these differences in frame rate and refresh frequency, and other signal variables, equipment designed to be compatible with the North American NTSC standard typically cannot be used with equipment designed for use with the European PAL standard. Therefore, a PAL-capable video cassette recorder/player (VCR) cannot be used with an NTSC-capable television. Likewise, video tapes formatted for playback by an NTSC-capable VCR cannot be played back by a PAL-capable VCR. Other standards, that are similarly incompatible with both the NTSC and PAL formats, are also used around the world.

Digital data can be encoded into video signals formatted in any of these incompatible video transmission formats. For example, a data encoder can encode each line in each video frame of a video signal by modulating a pulse onto the line to define a single bit of data. The data encoder may also encode additional pulses to increase bandwidth. Typically, these pulses are located in the horizontal overscan portion of the video signal outside the viewable area. A data detector decodes the pulses and converts the encoded data into usable digital information. Once decoded, the encoded data can be used to control a child's animated toy, to configure a set-top box, to provide advertising, e-mail, weather warnings, or a myriad of other uses.

In the past, the various video transmission standards used around the world has required that a separate data detector be created for each television transmission signal format. But producing separate detectors for each television format is expensive. To complicate matters even further, many VCRs ard televisions sold in Europe are capable of operating with both PAL and NTSC formatted signals. For example, a dual-standard capable VCR used to playback a PAL-formatted video cassette will output a PAL-formatted video signal. If tie same VCR is used to playback an NTSC-formatted video cassette, the VCR will output an NTSC-formatted video signal. Therefore, a PAL-capable data detector sold in Europe cannot be guaranteed to work with each type of input signal it may receive from a VCR Accordingly, it is highly desirable that the data detector be capable of determining the transmission format of the input video signal and decoding data from the video signal regardless of its transmission format.

It is very difficult to determine the transmission format of a video signal that contains irregularities in signal timing, such as a video signal output from EL VCR. Typical helical-scan VCRs utilize the output from multiple read/write heads to create the output video signal. As the videotape passes over the read/write heads, the VCR "switches" back and forth between the output of each head. In this manner, the VCR creates a video signal by combining the output of several heads. When the VCR "switches" between heads, however, a discontinuity of signal occurs and noise is introduced into the video signal. This "switching noise" is common in the signal output from VCRs, but is not problematic because it is typically outside the viewable area of the displayed video signal. This switching noise is problematic, however, when signal timing characteristics are used to determine the transmission format of a video signal output from a VCR. Additionally, other signal irregularities caused by mechanical-servo inaccuracies and imperfections in the videotape material can cause an improper determination to be made when using signal timing to determine the signal transmission format. If the data detector cannot correctly determine the transmission format of the video signal, it will be unable to decode the data encoded in the video signal and any connected devices that rely on the encoded data will not function properly.

Accordingly, there is a need for a method, system, and apparatus for decoding data encoded in the horizontal overscan portion of a video signal that may be in one of many different transmission formats. There is also a need for a method and system for decoding data encoded in the horizontal overscan portion of a video signal that does not utilize the timing characteristics of the video signal to determine the transmission format. There is a further need for a method, system, and apparatus for decoding data encoded in a video signal that can accurately decode data encoded in a video signal output from a VCR, regardless of its transmission format.

SUMMARY OF THE INVENTION

The present invention meets the needs described above by providing a method, system, and apparatus for decoding data encoded in the horizontal overscan portion of an encoded video signal independently of the transmission format of the video signal. By utilizing error-corrected sequence data encoded in the horizontal overscan portion of a video signal, the present invention can correctly decode data encoded in many different video transmission formats without relying on the timing characteristics of the video signal. Moreover, the present invention can accurately decode data encoded in a video signal output from a VCR containing head-switching noise and other signal irregularities, regardless of the transmission format of the video signal.

Generally described, the present invention determines the format of an input video signal. Based upon the format of the video signal, the present invention selects data extraction parameters. Based upon the selected data extraction parameters, the present invention extracts data encoded in the video signal. The data may then be transmitted to another device. In this manner, the present invention can decode data encoded in a video signal regardless of the transmission format.

More specifically, the present invention utilizes error-corrected data encoded in the horizontal overscan portion of an encoded video signal to determine the correct configuration for a data detector for the transmission format of the video signal. A video data detector (the "detector") is configured to decode data encoded in a video signal in a first type of video signal format, such as NTSC. When the detector receives the video signal, it enters a "fast acquisition" loop. In the fast acquisition loop, the detector attempts to decode a sequence of valid data from several consecutive frames of the video signal. If the detector is unable to decode a sequence of valid data from the consecutive frames of the video signal, the detector is reconfigured to decode data encoded in the video signal in a second type of video signal format, such as PAL. The detector then attempts to decode a sequence of valid data from several consecutive frames of the video signal. If the detector is again unable to decode a sequence of valid data from the consecutive frames, the detector is reconfigured for the first type of video signal format and the above process repeats. If, however, the detector decodes a sequence of valid data in the several consecutive frames of the video signal while configured for either the first or second video formats, the detector enters a "controlled persistence" loop.

While in the controlled persistence loop, the detector remains configured for the current type of video format and continues to decode data until it fails to decode valid data from a series of consecutive video frames (e.g. the signal is lost). When the detector fails to decode data from a series of consecutive video frames, the detector reenters the fast acquisition loop. If the detector was configured for the first type of video signal when the signal was lost, it is reconfigured for the second type of video signal when it reenters the fast acquisition loop. Likewise, if the detector was configured for the second type of video signal when the signal is lost, it is reconfigured for the first type of video signal when it reenters the fast acquisition loop. In a first embodiment of the present invention, the data detector can correctly determine the transmission format of the video signal within three to six video frames.

In a second embodiment of the invention, the data detector can advantageously determine the format of the video signal in exactly three video frames. In the second embodiment, the data detector is configured to decode valid data encoded in a video signal in a first type of signal format, such as NTSC. The detector then attempts to decode data from a signal frame of the video signal. If the data detector successfully decodes data from the frame, it waits for the next frame and again attempts to decode data from the next frame. If, however, the detector fails to decode data, it is reconfigured to decode data encoded in a second type of video signal format. The data detector then attempts to decode valid data in the same video frame. A counter is maintained that indicates the number of consecutive frames from which data was decoded for each type of signal format configuration. When the data detector decodes data from a predetermined number of consecutive frames in a given configuration, the data detector enters the controlled persistence loop described above in the given configuration. In this manner, the present invention can decode data encoded in a video signal regardless of the transmission format of the video signal.

That the present invention improves over the drawbacks of the prior art and accomplishes the objects of the invention will become apparent from the detailed description of the illustrative embodiment to follow.

BRIEF DESCRIPTION OF THE DRAWINGS

FIG. 3 is a block diagram illustrating the various components and processes that define a wireless modem.

FIG. 4A is a wave form diagram illustrating a data bit value "one" encoded in the horizontal overscan portion of a scan line of an encoded video signal.

FIG. 4B is a wave form diagram illustrating a data bit value "zero"encoded in the horizontal overscan portion of a scan line of an encoded video signal.

FIG. 5A is a diagram illustrating the location of data bits in a portion of a frame of an encoded video signal.

FIG. 5B is a diagram illustrating the location of data bits in two interlaced fields of a frame of an encoded NTSC video signal.

DETAILED DESCRIPTION

Figure 1:
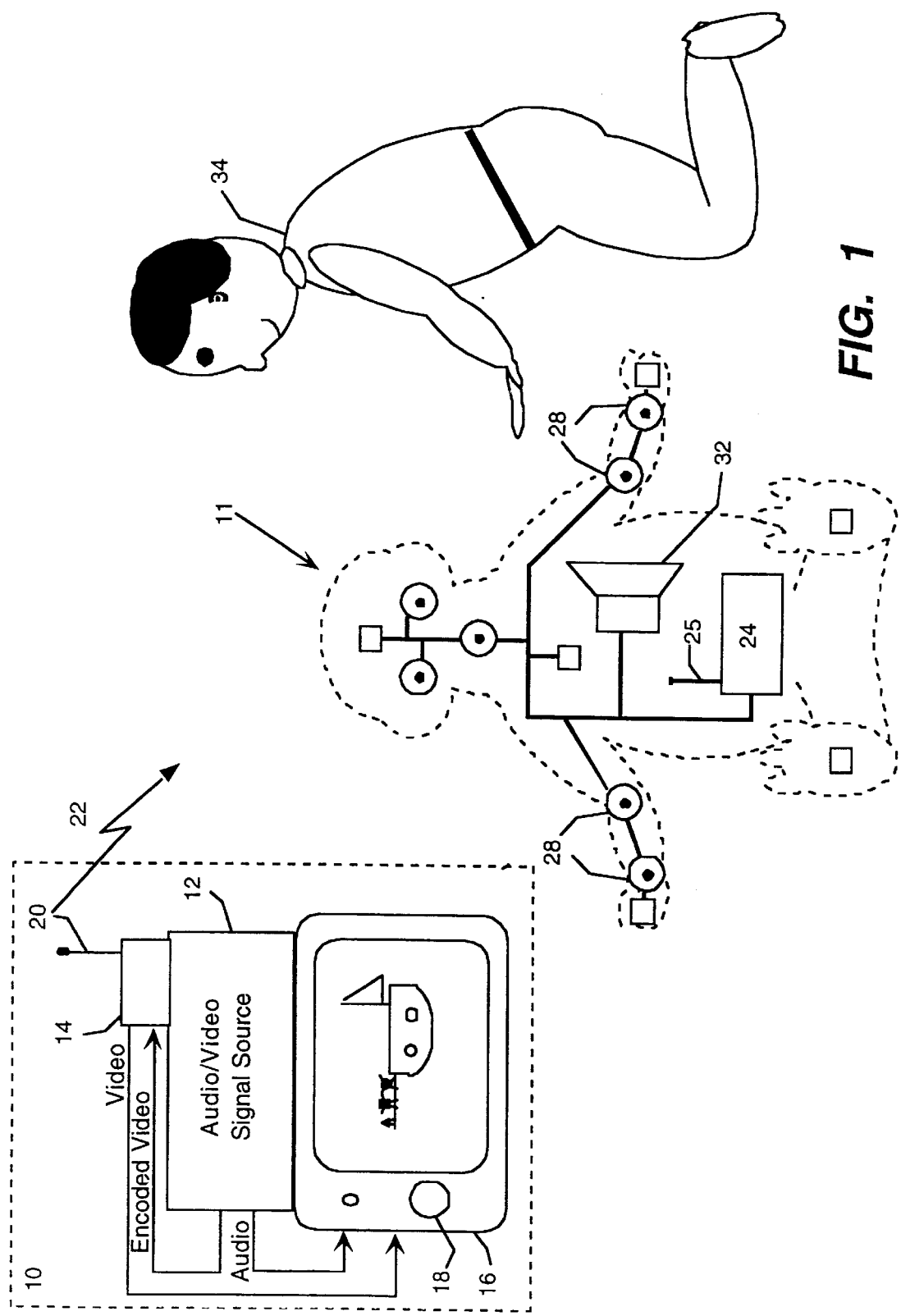
FIG. 1 is a block diagram of a wireless control environment including a controller and a controlled device.

The present invention may be embodied in a video data detector that accepts an encoded video signal as input and provides an error-corrected data stream as output. The video data detector (the "detector") may advantageously accept a video signal in any of a plurality of video transmission formats as input. Regardless of the format of the video signal, the detector decodes the encoded data and outputs the data to another device. For example, the detector may transmit the decoded data to a mechanical character to control the movement, speech, or other aspects of the character.

According to an aspect of the invention, the detector may be configured to utilize the timing characteristics of the video signal to determine the transmission format. For example, the detector may be configured to determine the format of the video signal by counting the number of horizontal video lines in each frame of video. If the detector counts 525 horizontal lines, the signal is NTSC. If the detector counts 625 lines, the signal is PAL. Similarly, because PAL- and. NTSC-formatted signals vary in the length of each horizontal video line, the detector may be configured to determine the line length of a horizontal video line in the signal to determine the format of the video signal.

In an illustrative embodiment of the present invention, the detector utilizers data encoded in the video signal to determine the video signal format. The detector is configured to decode data encoded in a video signal in a first type of transmission format by setting decode constants. The decode constants describe where encoded data is located in each frame of the video signal and the number of data words that are contained in each frame. The decode constants are predefined and are different for each video transmission format.

Once the detector has been configured for a first type of video signal format, the detector enters a "fast acquisition loop." In the fast acquisition loop, the detector attempts to decode intelligent signal detection words (ISDWs) encoded in several consecutive frames of the input video signal. A single ISDW is encoded in the same location of each field of the encoded video signal and distinguishes an encoded video signal from a normal video signal. A consecutive series of ISDWs defines a dynamic validation sequence in which each ISDW varies in at least two bits from the immediately preceding ISDW. Therefore, the detector determines whether a sequence of consecutive valid ISDWs (a dynamic validation sequence) were decoded from consecutive frames of the video signal. If the detector is unable to decode a valid sequence of consecutive ISDWs, the detector is reconfigured to decode data in a second video signal format by setting new decode constants.

Once the detector has been reconfigured for a second type of video format, it again attempts to decode a series of consecutive valid ISDWs from consecutive frames of the video signal. If the detector cannot decode a series of consecutive valid ISDWs, the detector is reconfigured for a first type of video signal formal, and the above process repeats. If, however, the detector is able to decode a series of consecutive ISDWs while configured for either video signal format, the detector enters a "controlled persistence loop."

In the controlled persistence loop, the detector maintains its configuration and continues to decode ISDWs from consecutive frames of the video signal. The detector also decodes data contained within each frame and outputs the decoded data. The detector continues decoding data and ISDWs from the video signal until it does not decode valid ISDWs from a number of consecutive video frames (e.g. the signal is lost). Once the detector is unable to decode valid ISDWs from a number of consecutive video frames, the detector reenters the "fast acquisition loop." If the detector is configured for the first type of video signal when the signal is lost, the detector is configured for the second type of video signal format when it reenters the fast acquisition loop. Likewise, if the detector is configured for the second type of video signal when the signal is lost, the detector is configured for the first type of video signal format when it reenters the fast acquisition loop. In this manner, the detector can decode data encoded in a video signal regardless of the transmission format of the video signal.

The detector described above decodes the ISDW and data encoded in each frame of the video signal by first detecting a vertical synchronization pulse (VSYNC) in the video signal. Once the detector has detected a VSYNC, it counts a number of horizontal lines specified by one of the decode constants, Once the detector has counted the specified number of lines, it decodes the bits of the ISDW from consecutive horizontal lines of the video signal. The detector then decodes the data contained in horizontal lines of the video signal. The number of data bits decoded is also set by one of the decode constants. Once the detector has decoded the ISDW and data for a given frame, it corrects any errors in the ISDW and determines if the ISDW is valid. If the ISDW is valid, the detector outputs the data bits that it decoded from the frame.

According to an aspect of the invention, in the "fast acquisition loop" the detector is configured to decode data encoded in a first signal format by setting decode constants. The detector then attempts to decode a valid ISDW from a single frame of the video signal. If the detector decodes a valid ISDW, it waits for the next frame of the video signal and again attempts to decode a valid ISDW. If, however, the detector does not decode a valid ISDW from the frame, it is reconfigured for a second signal format by setting decode constants. The detector then attempts to decode a valid ISDW in the same frame of the video signal. In this manner, the detector can decode an ISDW in either of several video formats in one frame of the video signal. The above process is then repeated for consecutive frames of the video signal. The detector maintains a counter indicating the number of consecutive ISDWs that have been decoded for each signal format. Once a predetermined number of consecutive ISDWs have been decoded from the signal for a given signal format, the detector enters the "controlled persistence loop" described above.

According to another aspect of the present invention, the detector decodes an ISDW in either of several video formats in the same frame of the video signal by first detecting a VSYNC in the video signal. Once the detector has detected a VSYNC, it counts a number of horizontal lines specified by one of the decode video format. Once the detector has counted the specified number of lines, it decodes the bits of the ISDW for the first video format from consecutive horizontal lines of the video signal. The detector then determines if the ISDW is valid. If the ISDW is not valid, the detector then counts the number of horizontal lines to the start of the first bit of the ISDW for the second video format. Once the detector has counted the specified number of lines, it decodes the bits of the ISDW for the second video format from consecutive horizontal lines of the video signal and determines whether the ISDW is valid. In this manner, the detector can determine whether an ISDW is present in a single frame of the video signal for several video formats. The present invention will now be described in connection with an illustrative embodiment.

Illustrative Embodiment: The "REALMATION" System

The present invention may be deployed in a wireless communication environment that includes a controller (also referred to as a master device) that communicates with and controls one or more controlled devices (also referred to as slave devices) on a single radio-frequency (RF) communication channel. A specific embodiment of the invention is known as the "REALMATION" system. In the embodiment described herein, the controller is a wireless modulator that receives a video signal from a data source. The data source may be a passive device, such as a cable system, VCR, or television broadcast signal, that feeds a previously-created data stream including video data and encoded control data to the wireless modem. The wireless modulator extracts the control data from the data stream, feeds the video data to the display device, and broadcasts the control data to one or more controlled devices, such as animated mechanical characters. The mechanical characters, in response to receiving the control data, move and talk as characters in the scenes depicted on the display device. animated mechanical characters. The mechanical characters, in response to receiving the control data, move and talk as characters in the scenes depicted on the display device.

Microsoft Corporation is developing a "REALMATION" product line that includes two main components: a controller (i.e., master device) known as the "REALMATION CONTROLLER," and one or more controlled devices (i.e., slave devices) known as "REALMATION PERFORMERS." A controlled device may be specially designed for a specific industrial, educational, research, entertainment, or other purpose. For example, a controlled device such as the "BARNEY" dinosaur character is specially designed for a learning and entertainment system for small children. Each controlled device includes an RF receiver system for receiving, demodulating, and decoding signals transmitted by the controller. The signals transmitted by the controller contain control data, such as speech coefficients and motion vectors. The control data causes the controlled device to behave as a character in a scene depicted on a display device driven by the controller.

The controller includes a data source that receives or generates video data and related control data so that one or more controlled devices may behave as characters in a scene depicted on a display device. To do so, the control system. includes a wireless modulator and a display device, such as a television or a computer monitor. In the embodiment described herein, the data source is a passive device, such as a cable system, VCR, or television broadcast signal, that feeds a previously-created data stream including video data and encoded control data to the wireless modulator. In this case, the wireless modulator decodes the control data from the data stream, feeds the video data to the display device, and broadcasts the control data to one or more controlled devices.

Regardless of the configuration, some type of data source provides a data stream including video and related control data, and the wireless modulator extracts the control data from the video signal, routes the video data to the display device, and broadcasts the control data to one or more controlled devices. To broadcast control data, the wireless modulator encodes the control data into a special differential-pulse data modulation (DDM) format and transmits the DDM-encoded control data to the controlled devices.

The operation of illustrative embodiments of the controller, the wireless modulator, and the controlled devices in these environments will be described in the context of programs running on microprocessor-based computer systems. Those skilled in the art will recognize that implementations of the present invention may include various types of program modules, use various programming languages, and be operable with various types of computing equipment. Additionally, although the descriptions of illustrative embodiments describe the controller as communicating with a controlled device over an RF communication channel, those skilled in the art will appreciate that substitutions to the RF communication channel can include other communication mediums such as fiber optic links, copper wires, infrared signals, etc.

Generally, a program, as defined herein, includes routines, subroutines, program modules, components, data structures, etc., that perform particular tasks or implement particular abstract data types. Moreover, those skilled in the art will appreciate that aspects of the present invention are applicable to other computer system configurations. These other computer system configurations include but are not limited to hand-held devices, multiprocessor systems, microprocessor-based or programmable consumer electronics, minicomputers, mainframe computers, and the like. Aspects of the present invention are also applicable within the context of a distributed computing environment, such as the Internet, in which tasks may be performed by remote processing devices that are linked through a communications network. In a distributed computing environment, program modules may be located in both local and remote memory storage devices.

The controlled devices may be low-cost, animated, mechanical characters, intended for use in an interactive learning and entertainment environment for children. At minimum, each controlled device includes a receiver system, a speech synthesizer, a speaker, a processor, and one or more servo motors. But a controlled device may include many other types of end effectors, such as light sources, heat sources, inflatable devices, pumps, and so forth. Indeed, the protocol for the wireless control system is designed to be forwardly compatible with a wide range of controlled devices that may be developed in the future. In response to the receiver system receiving control data on a predefined RF channel, the processor decodes, interprets, and responds in a manner dictated by the contents of the control data. The response of the processor may include actuating one or more servo motors, providing input to the speech synthesizer, or activating any of the other end effectors provided in a particular controlled device.

The controller engages in unidirectional communication with one or more controlled device. Although the description of the controller describes a video cassette recorder (VCR) or a cable television box interfacing with a program running on a microprocessor-based communication device, those skilled in the art will recognize that other implementations, such as direct broadcasting signals, laser disc players, video tape players, computing devices accessing CD-RON's, etc., may also suffice. In addition, a VCR or similar device may be integrated with a microprocessor-based communication device for operating in a stand-alone configuration.

The detailed description that follows is represented largely in terms of processes and symbolic representations of operations by conventional computer components, including a microprocessor unit (MPU), memory storage devices for the MPU, display devices, output control signals, and input devices. Furthermore, these processes and operations may utilize conventional computer components in a heterogeneous distributed computing environment, including remote file servers, remote computer servers, and remote memory storage devices. Each of these conventional distributed computing components is accessible by the MPU through a communications network.

The processes and operations performed by the computer include the manipulation of signals by a MPU or remote server and the maintenance of these signals within data structures resident in one or more of the local or remote memory storage devices. Such data structures impose a physical organization upon the collection of data stored within a memory storage device and represent specific electrical or magnetic elements. These symbolic representations are the means used by those skilled in the art of computer programming and computer construction to most effectively convey teachings and discoveries to others skilled in the art.

For the purposes of this discussion, a process is generally conceived to be a sequence of computer-executed steps leading to a desired result. These steps generally require physical manipulations of physical quantities. Usually, though not necessarily, these quantities take the form of electrical, magnetic, or optical signals capable of being stored, transferred, combined, compared, or otherwise manipulated. It is conventional for those skilled in the art to refer to these signals as bits, bytes, words, data, flags, variables, parameters, objects, properties, tags, types, identifiers, values, elements, symbols, characters, terms, numbers, points, records, images, files, or the like. It should be kept in mind, however, that these and similar terms are associated with appropriate physical quantities for computer operations, and that these terms are merely conventional labels applied to physical quantities that exist within and during operation of the computer.

It should also be understood that manipulations within the computer are often referred to in terms such as adding, comparing, receiving, sending, transmitting, replying, etc., which are often associated with manual operations performed by a human operator. The operations described herein are machine operations performed in conjunction with various inputs provided by a human, operator or user that interacts with the computer.

In addition, those skilled in the art will understand that the programs, processes, methods, etc., described herein are not related or limited to any particular computer or apparatus, nor are they related or limited to any particular communication network architecture. Rather, various types of general purpose machines may be used with program modules constructed in accordance with the teachings described herein. Similarly, it may prove advantageous to construct a specialized apparatus to perform the method steps described herein. The specialized apparatus could consist of dedicated computer systems in a specific network architecture with hard-wired logic or programs stored in nonvolatile memory, such as read only memory, magnetic storage devices, or optical storage devices.

The communication between the controller and controlled devices will be described in the context of RF signal transmissions formed in accordance with amplitude modulation (AM) techniques. The RF signals are used to transfer symbolic representations of digital information from one device to another. The RF signals are generated by modulating the amplitude of a carrier signal in a predetermined manner based on the value of a symbolic representation of the digital data. Those skilled in the art will understand that a variety of communication technologies may be utilized for transmitting the information between these devices and that describing the use of AM techniques should not restrict the principles of any aspect of the present invention.

Referring now to the drawings, in which like numerals represent like elements throughout the several figures, aspects of the present invention and illustrative operating environments will be described. Reference is made to FIGS. 1–7 below to provide a description of suitable environments in which the invention may be implemented. Reference is then made to FIGS. 8–12 to describe the illustrative method for decoding the data encoded in the video signal.

FIG. 1 illustrates an illustrative environment for embodiments of the present invention. This environment may be operated as a learning and entertainment system for a child. The environment includes a controller 10 that controls a controlled device 11. The controller 10 includes an audio/video signal source 12, a wireless modulator 14, an antenna 20, and a display device 16 including a speaker 18. The controller 10 transmits control data to the controlled device 11 via an antenna 20 and an RF communication channel 22. To accomplish this task, the wireless modulator 14 interfaces with the audio/video signal source 12 and the display device 16 through a standard video interface. Over this standard video interface, the wireless modulator 14 receives a video signal encoded with control data (encoded video) from the audio/video signal source 12. The wireless modulator 14 decodes the control data from the encoded video signal, and then transfers the control data to a controlled device 11 through the RF communication channel 22.

In addition, the wireless modulator 14 passes the video signal to the display device 16. The audio/video signal source 12 also interfaces with tile speaker 18 in the display device 16. Over this interface, the audio/video signal source 12 provides audio for an audio/video presentation. Thus, a child 34 can observe the audio/video presentation on the display device 16 and the speaker 18 while the wireless modulator 14 transmits control data to one or more controlled device 11. The reception of the control data causes the controlled device 11 to move and talk as though it is a character in the audio/video presentation.

There is no need to modify the encoded video signal before passing it to the display device 16. Typically, the controller 14 receives the encoded video signal, which is a standard video signal that has been modified to include digital information in the horizontal overscan intervals of the scan lines, which are invisible to the display device 16. Thus, the display device 16 can receive and display the encoded video signal without modification. The controller 14 only needs to extract the control data from the encoded video signal and generate the RF-modulated control signals for transmission to the controlled device 11.

The controlled device 11 receives the RF signals from the controller at the antenna 25. The receiver system 24 processes the received RF signals to recover the control data. The controlled device 11 interprets the received control data and responds to the control data by controlling the operation of one or more servo motors 28 or other end effectors within the controlled device 11, which includes providing speech data to be audibly presented by the speaker 32. Thus, transmitting the appropriate control data to the controlled device 11 causes the controlled device 11 to move and talk as though it is a character in the audio/video presentation.

Figure 2:
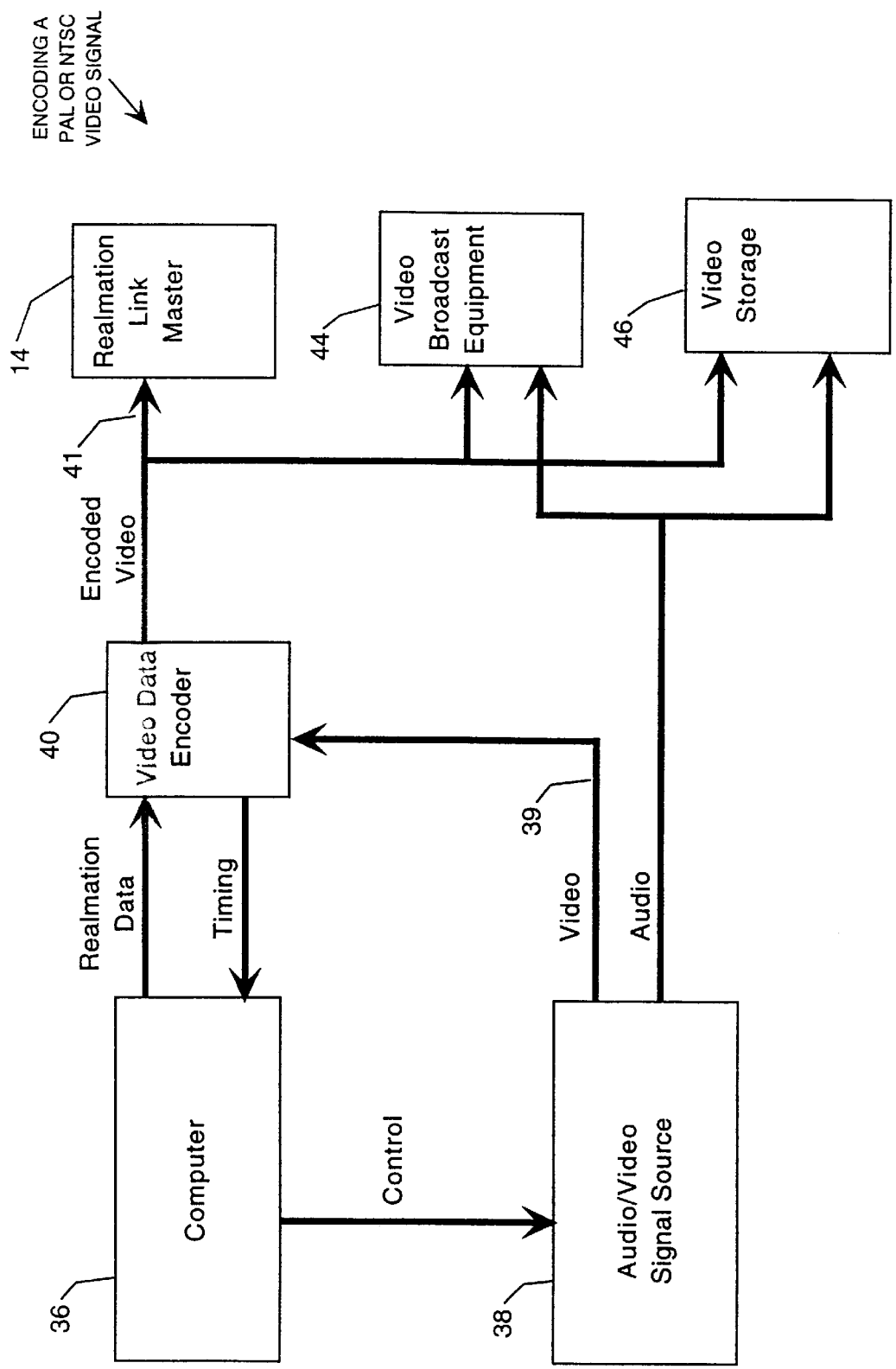
FIG. 2 is a block diagram illustrating a system for creating a data stream including video data and encoded control data.

FIG. 2 is a block diagram illustrating a system for creating an encoded video data stream including video data and encoded control data. A variety of sources, including but not limited to, a video cassette recorder or player, a cable reception box, a TV tuner, a laser disc player, or a computer with a video output, may provide the encoded video. In FIG. 2, the computer system 36 interfaces with a video data encoder 40 and an audio/video signal source 38. The audio/video signal source 38 provides two output signals: video and audio. These output signals may include live camera feeds, prerecorded playbacks, broadcast reception, etc. The computer system 36 controls the operation of the audio/video source 38 via a control signal. The control signal gates the output of the video and audio signals from the audio/video signal source 38.

The computer system 36 also provides the control data that is encoded onto the video signal. The computer system 36 transfers the control data and gates the video signal to the video data encoder 40. The video data encoder 40 concatenates encoded data with the lines of the video signal 39 to create an encoded video signal 41, as described in detail with respect to FIGS. 4A–4B, 5A–5B, 6, and 7. A protocol is defined for the encoded data that is addressable, forwardly compatible, error tolerant, and feasible to deploy in connection with a system that is primarily intended to be a children's entertainment product. This protocol is described in detail in U.S. patent application Ser. No. 08/885,385, entitled "METHOD AND SYSTEM FOR ENCODING DATA IN THE HORIZONTAL, OVERSCAN PORTION OF A VIDEO SIGNAL," inventor Leonardo Del Castillo, filed on Jun. 30, 1997, which is owned by a common assignee and incorporated herein by reference.

The video data encoder 40 combines the video signal and the control date by encoding the control data onto the video signal 39 (i.e., generating an encoded video data stream). This encoding technique includes modulating the luminance of the horizontal overscan area of the video signal on a line-by-line basis. For example, the overscan area of each scan line may be modulated to represent a single control data bit. Furthermore, the field boundaries of the video signal provide a framing structure for the control data, in which each frame contains a fixed number of data words.

More specifically, each field of the video signal contains a pattern identification word consisting of four bits. The value of the pattern identification word in each contiguous field cyclically sequences through a defined set of values. The presence of the pattern identification word distinguishes an encoded video signal from a normal video signal. In a normal video signal, random noise appears in place of the pattern identification word. A detector attempting to recover control data from an encoded video signal therefore determines whether the signal is an encoded video signal by detecting the presence of the pattern identification word. Thus, the pattern identification word provides a layer of integrity to the recovered control data beyond that of simple checksum error detection.

The wireless modulator 14 receives the encoded video signal 41 from the video data encoder 40 and decodes the control data from the encoded video signal. The wireless modulator 14 then transmits the control data to one or more controlled devices, represented by the controlled device 11 shown in FIG. 1. Alternatively, video broadcast equipment 44 may receive the encoded video signal along with the audio signal and then broadcast the signals to one or more remotely located wireless modulators and/or wireless modems. In another alternative, video storage equipment 46 may receive the encoded video signal along with the audio signal and then store the signals in a storage medium for furture retrieval, such as video tape. The encoded video signal 41, may be in any of a number of video transmission formats, such as PAL or NTSC.

FIG. 3 is a block diagram illustrating the various components that define the controller, or wireless modulator 14. Each of the components of the wireless modulator 14 may be implemented in hardware, software, or a combination of hardware and software. The video data detector 48 of the wireless modulator 14 receives a video signal 41, originating from an audio/video signal source 12, and identifies whether the video signal is an encoded video signal. The audio/video signal source 12 may be any of a variety of conventional video sources, such as a video camera, a broadcast or cable television signal, a video tape player, the Internet transmitting a video signal, a computer generating a video signal, and ,so forth. The encoded video signal 41 may be any type of video signal that includes a plurality of frames that each include a plurality of scan lines. For example, the encoded video signal 41 may be a standard 525-line, two-field interlaced NTSC television signal that includes 30 frames per second, each frame including two fields of 262.5 interlaced lines, as is well known to those skilled in the art. Likewise, the encoded video signal 41 may be a standard 625-line, two-field interlaced PAL television signal that includes 25 frames per second or any other standard that may be in use now or developed in the fixture.

The encoded data does not interfere with the transmission of the underlying video signal 39. In addition, because the encoded data is located in the pre-visible or post-visible portions of the video signal 39, the encoded data does not visibly interfere with the operation of typical televisions or monitors. Therefore, the encoded video signal 41 may be passed directly from the video data detector 48 to the display device 16, which displays the underlying video signal 39 undisturbed by the encoded data.

The video data detector 48 detects the presence of the encoded data in the encode video signal 41 by detecting the presence of an intelligent signal detection word (ISDW), as described with reference to FIGS. 4A–4B, 5A–5B, and 6–12. Preferably, a single ISDW is transmitted in the same location of each field of the encoded video signal 41. A consecutive series of the ISDWs defines a dynamic validation sequence in which each ISDW varies in at least two bits from, the immediately preceding signal detection word. For example, the dynamic validation sequence may be the binary representation of 8, 1, 10, 3, 12, 5, 14, 7.

If the video data detector 48 detects the presence of the pattern identification word in the received video signal, then the video signal is am encoded video signal. If the signal is an encoded video signal, the video data detector 48 extracts the control data from the encoded video signal, provides the control data to the data error processor 50, and simultaneously provides the encoded video signal to the display device 16.

The video data detector 48 reads the data, if any, in the specified lines, corrects the data for correctable errors that may have occurred in the ISDW bits, and detects the presence of the ISDW. In each frame, the ISDW is typically followed by a number of content words. If the video data detector 48 detects the presence of the ISDW in the encoded video signal 41, it extracts the content words from the encoded video signal and assembles the content words into a serial data communication signal. The video data detector 48 then transmits the serial data communication signal to a data error processor 50. Operation of the video data detector 48 is described in greater detail below with respect to FIGS. 8–12.

The data error processor 50 strips out the error correction bits, corrects any correctable errors in the content bits, and assembles the corrected content words into a 9-bit error corrected data stream. This 9-bit error corrected data stream is transmitted to a protocol handler 52, which includes a number of data handlers that detect and route device-specific control data to their associated data sinks Each data handler detects address data, including a short or long address assigned. to its associated data sink, and responds by routing the following device-specific control data to its associated data sink. Each data handler may also reformat the device-specific control data into appropriately-formatted data streams for its associated data sink.

In particular, one of the data sinks reformats the device-specific control data into MIDI format for transmission to a wireless controlled device 11, shown in FIG. 1, by way of a DDM encoder 54, a modulator 60, and a transmitter 56, as described previously. One particular method for operating the DDM encoder 54 is described in U.S. application Ser. No. 08/794,921 entitled "A SYSTEM AND METHOD FOR CONTROLLING A REMOTE DEVICE," inventors Leonardo Del Castillo, Damon Danielli, Scott Randall, Craig Ranta, and Harjit Singh, filed on Feb. 4, 1997, which is owned by a common assignee and incorporated herein by reference. In general, the data encoder 54 encodes the data and provides the encoded data to the RF transmitter 56. The RF transmitter 56 receives the encoded data and modulates a predefined RF carrier (i.e., a predefined RF channel approved for use in connection with the wireless communication system) with the encoded data. The RF transmitter then transmits the modulated carrier through the antenna 20. During processing of the control data, the various components of the wireless modulator 14 may temporarily store the control data in a data buffer, such as the representative data buffer 58.

The display device 16 receives the video signal from the video data detector 48 or another source along with an audio signal from the audio/video signal source 16. The display device 16 and the speaker 18 then display the audio/visual presentation defined by the video signal, typically including a series of scenes depicted on the display device 16 and the speaker 18, in a conventional manner.

As noted previously, the audio/video presentation on the display device 16 and the control data that is transmitted from antenna 20 are synchronized so that the controlled device 11, shown in FIG. 1, behaves as a character in the scene depicted on the display device 16. The processes of detecting the control data, correcting any errors, encoding the control data, and then modulating a carrier may introduce a slight delay. Nevertheless, embedding the control data within the video data in the encoded video signal effectively synchronizes the operation of the controlled device with the scene depicted on the display device 16. In other words, the video signal received by the display device 16 and the control data transmitted from antenna 20 are synchronized because they are obtained from the same area of the original encoded video signal, in which context sensitive control data is embedded within a video signal. Thus, the encoded video signal may be separated in real-time into control data and related video data so that the controlled devices move and/or talk in a manner that relates to the audio/video presentation.

FIGS. 4A and 4B show the location of the encoded data in the context of a single scan line of the encoded video signal 41. FIG. 4A is a wave form diagram illustrating a data bit value "one" 66 encoded in the horizontal overscan portion of a scan line of the encoded video signal 41. The scan line represents one line of one frame displayed on the display device 18. The vertical axis represents the magnitude of the signal wave form 72 in units of IRE and the horizontal axis represents time in micro-seconds, as is familiar to those skilled in the art. Although FIGS. 4A–B are not drawn precisely to scale, important reference points are marked in the units of their corresponding axis. The wave form 72 for the scan line begins with a horizontal synchronization pulse 64 down to −40 IRE, which is a timing signal that indicates the beginning of the scan line (i.e., time=0) when the leading edge of the pulse passes through −20 IRE to establish the horizontal reference point (H-REF). The horizontal synchronization pulse 64 is followed by a sinusoidal color burst 78 (the approximate envelope is shown), which is used as a calibration signal for the display device 16. The color burst 78 is followed by a wave form representing the visible raster 70 (the approximate envelope is shown), which creates and typically overlaps slightly the visible image on the display device 16.

The wave form 72 includes a pre-visible horizontal overscan area 68, that occurs after the color burst 78 and before the visible raster 70. The video data encoder 40 locates a pre-visible (i.e., before the visible raster 70) data bit "one" 66 by driving the wave form 72 to a predetermined high value, such as 80 IRE, in an interval, Ts 80, after a H-REF. For a PAL-encoded signal, the interval Ts 80 is approximately from 10.2 micro-seconds to 11.2 micro-seconds after a H-REF. For an NTSC-encoded signal, the interval Ts 80 is approximately from 9.2 micro-seconds to 10.2 micro-seconds after a H-REF. Because the pulse denoting the data bit "one" 66 occurs after the calibration interval of the color burst 78 and before the visible raster 70, it does not interfere with the operation of the display device 16 or appear on the image displayed.

FIG. 4B is a wave form diagram illustrating a data bit value "zero" 66' encoded in the horizontal overscan portion of a scan line of the encoded video signal 72'. The video data encoder 40 locates the pre-visible data bit "zero" 66' by driving the wave form 72' to a predetermined low value in the interval Ts 80 after a H-REF. In an encoded PAL signal, the wave is driven to an IRE value of 0 in the interval from 10.2 micro-seconds to 11.2 micro-seconds after H-REF. In an encoded NTSC signal, the wave is driven to an IRE value of 7.5 in the interval from 9.2 micro-seconds to 10.2 micro-seconds after a HREF.

FIG. 5A shows the location of encoded data in the context of a standard. NTSC or PAL video frame. Each frame of the video data includes a vertical blanking interval 82 (during which the electron gun in the CRT of the display device 16 sweeps back and up from the end of the just completed frame to the beginning of the next frame) followed by an active video interval 84, which includes a number of left-to-right scan lines that sequentially paint the display device 16 from the top to the bottom of the screen. At the end of the vertical blanking interval 82, the last two pulses are typically reserved for closed caption data 86 and vertical blanking data 88, which may be already dedicated to other purposes. In addition, the bottom of each field is typically corrupted by head switching noise present in the output of helical-scan video tape players of consumer formats such as VHS and 8mm. Therefore, the horizontal overscan portion of individual scan lines provides the preferred location for encoded data bits 66 and 66' of the encoded video signal 81.

FIG. 5B is a diagram illustrating the location of data bits in the two interlaced fields of the standard NTSC video frame. That is, FIG. 5B shows the location of the encoded data in the context of a complete NTSC 525-line two-field interlaced video frame. The frame of video data includes lines 1–262 in field-1 90 interlaced with lines 263-525 in field-2 92. Field-1 90 includes a vertical blanking interval 82A and an active video interval 84A. The vertical blanking interval 82A includes lines 1–22 and concludes with line 21, which may include closed caption data 86A, and line 22, which may include vertical blanking data 88A. An ISDW 94A is encoded in lines 23–29 and content data 96A is encoded in lines 30–237. Field-2 92 includes a vertical blanking interval. 82B and a active video interval 84B. The vertical blanking interval 82B includes lines 263–284 and concludes with line 283, which may include closed caption data 86B, and line 284, which may include vertical blanking data 88B. An ISDW 94B is encoded in lines 286–292 and content data 96B is encoded in lines 293–500.

Each ISDW preferably includes a plurality of data bits and a plurality of error correction bits defining a correction sequence that allows a single-bit error in the data bits to be detected and corrected. For example, the ISDW may include a seven-bit Hamming code (i.e., four data bits and three error correction bits) in the format shown below in Table 1.

TABLE 1

| Video Line Number | | | |
|---|---|---|---|
| Field 1 | Field 2 | Symbol | Description |
| 23 | 286 | Q0 | Sequence Word Bit 0 |
| 24 | 287 | Q1 | Sequence Word Bit 1 |
| 25 | 288 | Q2 | Sequence Word Bit 2 |
| 26 | 289 | Q3 | Sequence Word Bit 3 |
| 27 | 290 | B0 | B0 = Q1 x Q2 x Q3 |
| 28 | 291 | B1 | B1 = Q0 x Q1 x Q3 |
| 29 | 292 | B2 | B2 = Q0 x Q2 x Q3 |

In each field 90, 92 of an NTSC video frame, up to 13 16-bit content words 96 may follow the ISDW 94, as shown below in Table 2.

TABLE 2

| Word Value Range | | |
|---|---|---|
| Field 1 | Field 2 | Defined Class |
| 30 | 293 | Start of Content Word 0 |
| 46 | 309 | Start of Content Word 1 |
| 62 | 325 | Start of Content Word 2 |
| 78 | 341 | Start of Content Word 3 |
| 94 | 357 | Start of Content Word 4 |
| 110 | 373 | Start of Content Word 5 |
| 126 | 389 | Start of Content Word 6 |
| 142 | 405 | Start of Content Word 7 |
| 158 | 421 | Start of Content Word 8 |
| 174 | 437 | Start of Content Word 9 |
| 190 | 453 | Start of Content Word 10 |
| 206 | 469 | Start of Content Word 11 |
| 222 | 485 | Start of Content Word 12 |
| 237 | 500 | End of Content Word 12 |
| 238–263 | 517–525 | Unused video lines |

Each content word preferably includes a plurality of data bits 100 and a plurality of error correction bits 102 defining a correction sequence that allows a single-bit error in the data bits to be detected and corrected. For example, the content word may include a seven-bit Hamming code (i.e., four data bits and three error correction bits) and a nine-bit Hamming code (i.e., five data bits and four error correction bits) in the format shown below in Table 3.

TABLE 3

| Offset from first line | Symbol | Description |
|---|---|---|
| +0 | M0 | Data Bit 0 |
| +1 | M1 | Data Bit 1 |
| +2 | M2 | Data Bit 2 |
| +3 | M3 | Data Bit 3 |
| +4 | B0 | B0 = M1 x M2 x M3 |
| +5 | B1 | B1 = M0 x M1 x M3 |
| +6 | B2 | B2 = M0 x M2 x M3 |
| +7 | M4 | Data Bit 4 |
| +8 | M5 | Data Bit 5 |
| +9 | M6 | Data Bit 6 |
| +10 | M7 | Data Bit 7 |
| +11 | M8 | Data Bit 8 |
| +12 | B3 | B3 = M4 x M5 x M6 x M7 |
| +13 | B4 | B4 = M4 x M5 x M7 x M8 |
| +14 | B5 | B5 = M4 x M6 x M7 x M8 |
| +15 | B6 | B6 = M5 x M6 x M7 x M8 |

Figure 6:
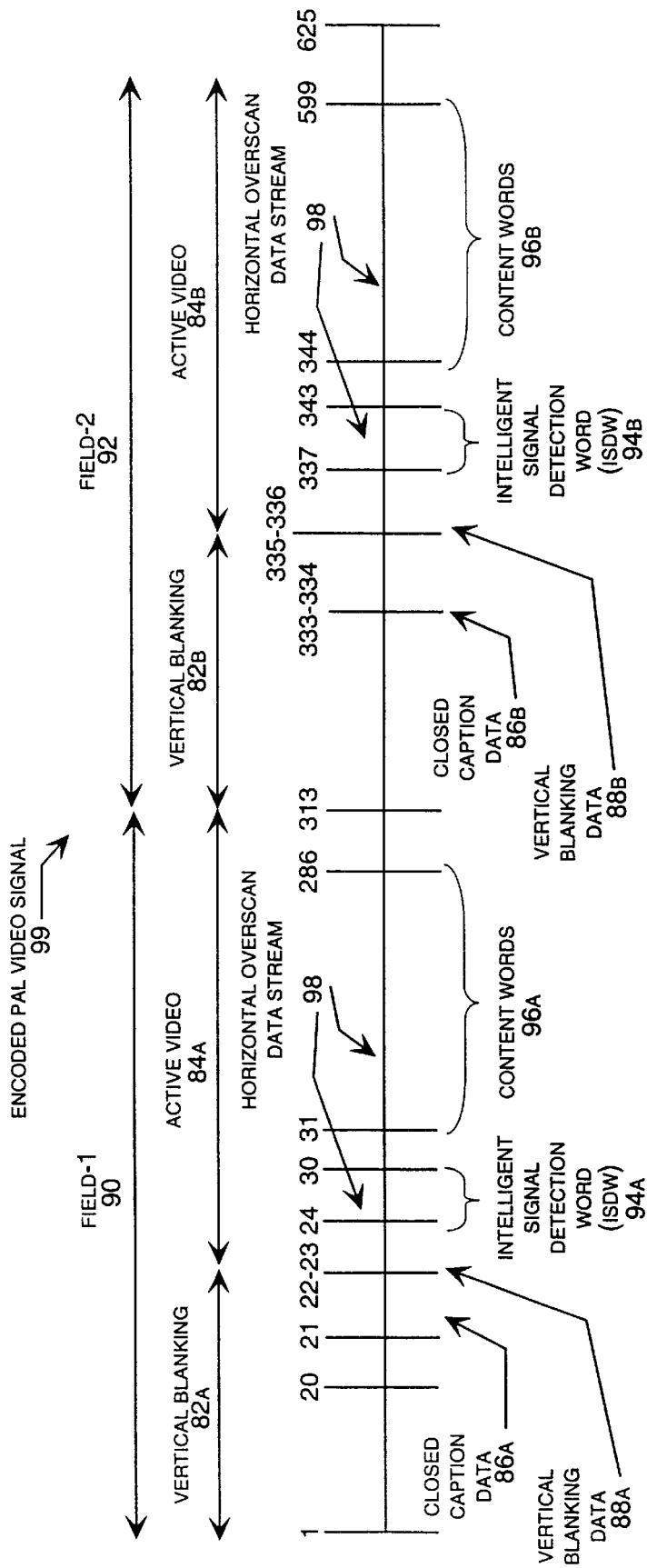
FIG. 6 is a diagram illustrating the location of data bits in two interlaced fields of a frame of an encoded PAL video signal.

Although many other, often more sophisticated, data correction techniques may be used, Hamming codes are preferred because of their simplicity and small computation requirement FIG. 6 is a diagram illustrating the location of data bits in the two interlaced fields of the standard PAL video frame. That is, FIG. 6 shows the location of the encoded data in the context of a complete PAL 625-line two-field interlaced video frame 99. The frame of video data includes lines 1–313 in field-1 90 interlaced with lines 314–625 in field-2 92. Field-1 90 includes a vertical blanking interval 82A and an active video interval 84A. The vertical blanking interval 82A includes lines 1–23 and concludes with line 21, which may include closed caption data 86A, and lines 22–23, which may include vertical blanking data 88A. An ISDW 94A is encoded in lines 24–30 and content data 96A is encoded in lines 31–286. Field-2 92 includes a vertical blanking interval 82B and a active video interval 84B. The vertical blanking interval 82B includes lines 314–336 and concludes with line 334, which may include closed caption data 86B, and lines 335–336, which may include vertical blanking data 88B. An ISDW 94B is encoded in lines 337–343 and content data 96B is encoded in lines 344–599.

As noted above, each 16-bit content word includes nine data bits, and each frame in an NTSC video signal includes 13 content words. Thus, encoding one bit per scan line produces a bandwidth for the data encoded in a typical 59.94 Hertz NTSC video signal of 7,013 Baud. This bandwidth is sufficient to provide sufficient data to control several wireless controlled devices in the manner described above.

The 7,013 Baud one-bit-per-scan-line bandwidth of the encoded data is also sufficient to provide data for additional services, such as advertising, subscription, and emergency warning information for transmission to the display device and other data sinks. For example, these services might include e-mail, foreign language subtitling, intercom capability, telephone pages, weather warnings, configuration data for a set-top box, and so forth. The bandwidth may be increased by locating a second pulse in the post-visual horizontal overscan area, which occurs after the visible rester and before the horizontal blanking interval (during which the electron gun in the CRT of the display device sweeps back from the end of the just completed scan line to the beginning of the next scan line).

The bandwidth may be further increased by enabling each pulse to represent more that just two (1,0) states. For example, for 3 states (c.f., the 1.0, 1.5, 2.0 DDM pulse widths), an analog of the "REALMATION" DDM protocol could be used. For 4 states, the pulse could represent 2 bits (e.g., 100–80 IRE=1,1; 70–50 IRE=1,0; 40–20 IRE=0,0; 10 to −40 IRE=0,1). For 8 states, the pulse could represent 3 bits; for 16 states, the pulse could represent 4 bits, and so forth. The data detector described herein may be configured to decode data encoded in any of these formats.

Each ISDW encoded in a PAL video signal includes a plurality of data bits and a plurality of error correction bits defining a correction in the same manner as described above with respect to an NTSC video signal and FIG. 5B. However, the PAL signal differs from the NTSC signal in that each field 90 and 92 of a PAL video frame may be encoded with up to 16 16-bit content words.

Figure 7:
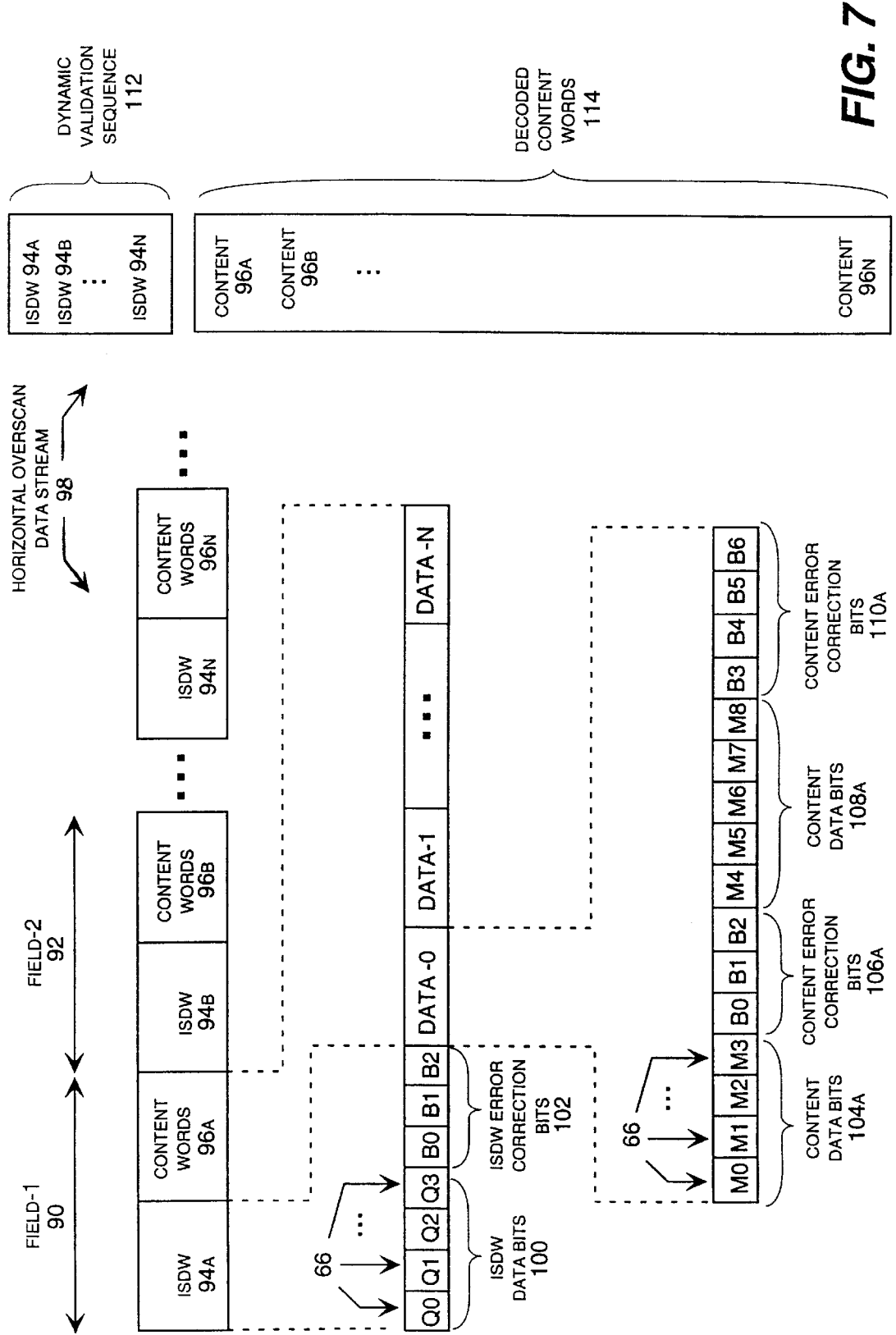
FIG. 7 is a message protocol diagram illustrating the format of the horizontal overscan data stream of an encoded video signal.

FIG. 7 is a message protocol diagram illustrating the format of the horizontal overscan data stream 98 of the encoded video signal 41. The horizontal overscan data stream 98 is typically created by the video data detector 48, which extracts the data from the encoded video signal 41 and assembles the extracted data into a serial data communication signal. Each field of the horizontal overscan data stream 98 includes intelligent signal detection data, typically a single 7-bit ISDW, and content data, typically 13 16-bit content words for an NTSC signal and 16 16-bit content words for a PAL signal. The representative ISDW 94*a* includes four data bits 100 and three error correction bits 102, as shown Table 1, above. The representative content word 96a includes four data bits 104a, followed by three error correction bits 106a, followed by five data bits 108a, followed by four error correction bits 110a, as shown Tables 2 and 3, above.

A consecutive series of the ISDWs 94a–n defines a dynamic validation sequence 112 in which each ISDW varies in at least two bits from the immediately preceding signal detection word For example, the dynamic validation sequence may be the binary representation of 8, 1, 10, 3, 12, 5, 14, 7. Causing the dynamic validation sequence 112 to vary in at least two bits in each successive ISDW reduces the chance that random noise may be misinterpreted as ISDW data.

Figure 8:
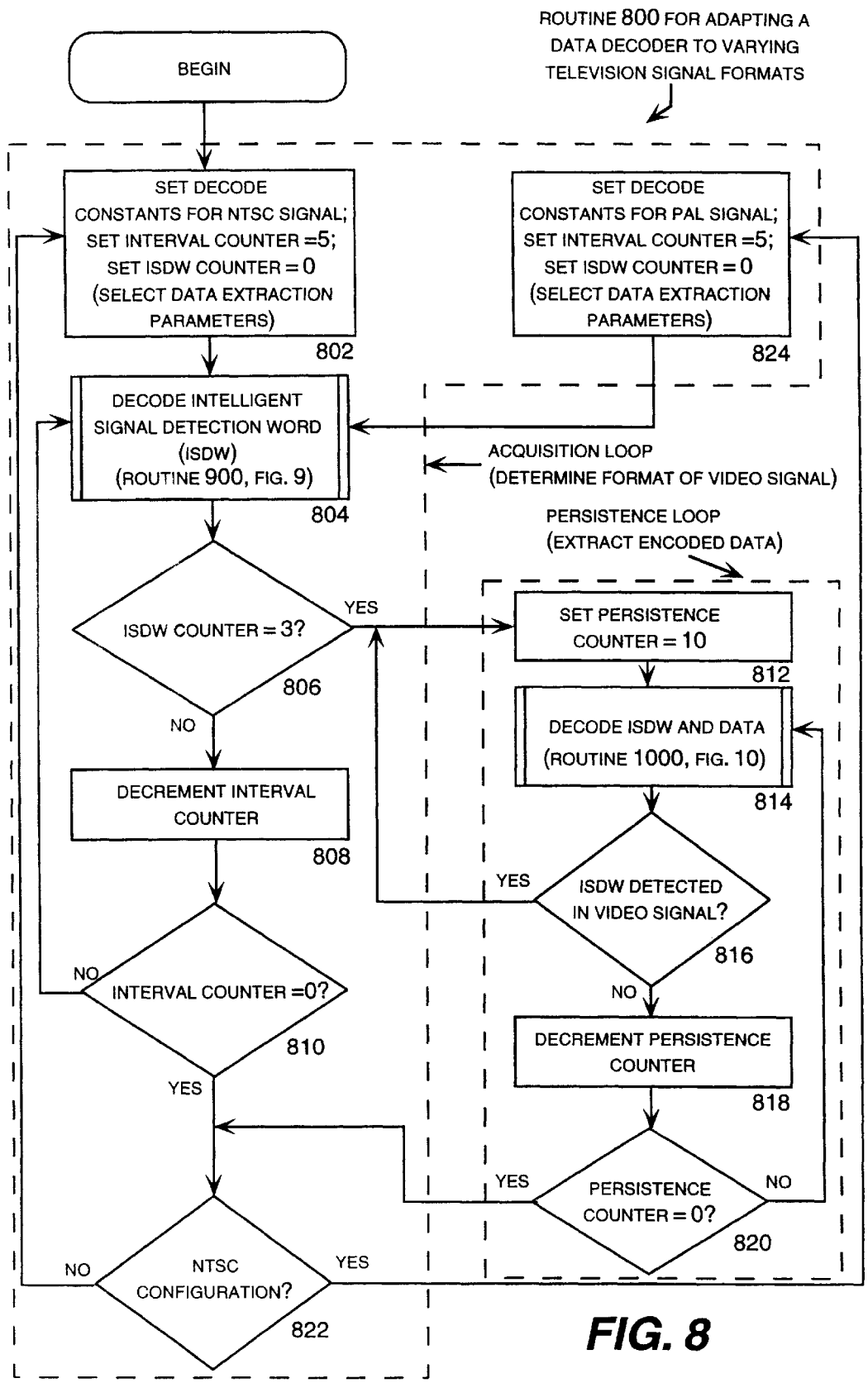
FIG. 8 is a logic flow diagram illustrating the operation of a video data detector adapted to decode multiple television signal formats.

FIG. 8 shows a method 800 for adapting a data detector, or data detector 48, to varying television signal formats. In step 802, decode constants are set to configure the video data detector 48 (the "detector") for an NTSC video signal. These decode constants describe three parameters relative to the video signal: the time, in micro-seconds, between the horizontal reference point ("H-REF") and the data sampling point Ts 80; the number of interstitial video lines from the vertical reference point ("VSYNC") to the line carrying the first bit of the ISDW; and the number of words to decode per video field. For an NTSC signal, the preferred decode constants are 10.2, 23, and 13, respectively. Still referring to step 802, an interval counter is set to five and an ISDW counter is set to zerco. The detector 48 uses the interval counter to keep track of the number of video frames that it has decoded in its current configuration. The detector 48 uses the ISDW counter to keep track of the number of consecutive ISDWs that it has decoded in its current configuration.

From step 802, the method continues to step 804, where the detector 48 attempts to decode an ISDW in the current video frame. The method 900 for decoding an ISDW is discussed below with reference to FIG. 9. At step 806, the detector 48 determines whether the ISDW counter is equal to three. The ISDW counter will only equal three when the detector 48 has decoded three consecutive ISDWs from three consecutive frames of the video signal. If the ISDW counter equals three, the "YES" branch is followed to step 812. If the ISDW counter does not equal three, the "NO" branch is taken to step 808, where the detector 48 decrements the interval counter.

From step 808, the method continues to step 810, where the detector 48 determines whether the interval counter is equal to zero. The interval counter will equal zero when the detector 48 has been unable to decode valid ISDWs from the five previous consecutive video frames. Therefore, if the interval counter does not equal zero, the "NO" branch is followed to step 804, where the detector 48 attempts to decode an ISDW from a frame of the video signal. If the interval counter equals zero, the "YES" branch is followed to step 822, where the detector 48 Determines whether it is configured for an NTSC signal. If the detector 48 is not configured for an NTSC signal, the "NO" branch is followed to step 802, where the detector 48 is configured for an NTSC signal as described above. If the detector 48 is configured for an NTSC signal, the "YES" branch is followed to step 824 where the detector 48 is configured for a PAL signal. As described above, decode constants are set to configure the detector 48 for a PAL video signal. For a PAL signal, the decode constants are 11.2, 24, and 16. In. step 824, the detector 48 resets the interval counter and the ISDW counter to five and zero, respectively. Step 824 continues to step 804, where the detector 48 attempts to decode an ISDW in a frame of the video signal.

Referring again to step 806, if the detector 48 determines that the ISDW counter is equal to three, the detector 48 has decoded valid ISDWs from three consecutive frames of the video signal while configured for either a PAL or NTSC signal. Valid ISDWs decoded from three consecutive frames of the video signal in a given configuration indicates that the detector 48 has correctly determined the signal format Therefore, if the ISDW counter equals three, the "YES" branch is followed to step 812, where the detector 48 sets a persistence counter to ten. The detector 48 uses the persistence counter to count the number of consecutive video frames from which it is unable to decode a valid ISDW. If the detector 48 is unable to decode valid ISDWs from ten consecutive frames, the detector 48 reenters the acquisition mode described above. At step 814, the detector 48 decodes the ISDW and data words from a frame of the video signal. The method 1000 for decoding an ISDW and data from a frame of the video signal is discussed below with reference to FIG. 10.

From step 814, the method continues to step 816, where the detector 48 determines whether it decoded a valid ISDW from the frame. If the detector 48 decoded a valid ISDW, the method 800 branches to step 812, where the persistence counter is reset to 10. If the detector 48 did not decode a valid ISDW, the method 800 continues to step 818, where the detector 48 decrements the persistence counter. At step 820, the detector 48 determines whether the persistence counter is equal to zero. If the persistence counter is not equal to zero, the "NO" branch is followed to step 814, where the detector 48 decodes an ISDW and data from a frame of the video signal. If the persistence counter is equal to zero, the "YES" branch is followed to step 822.

Figure 9:
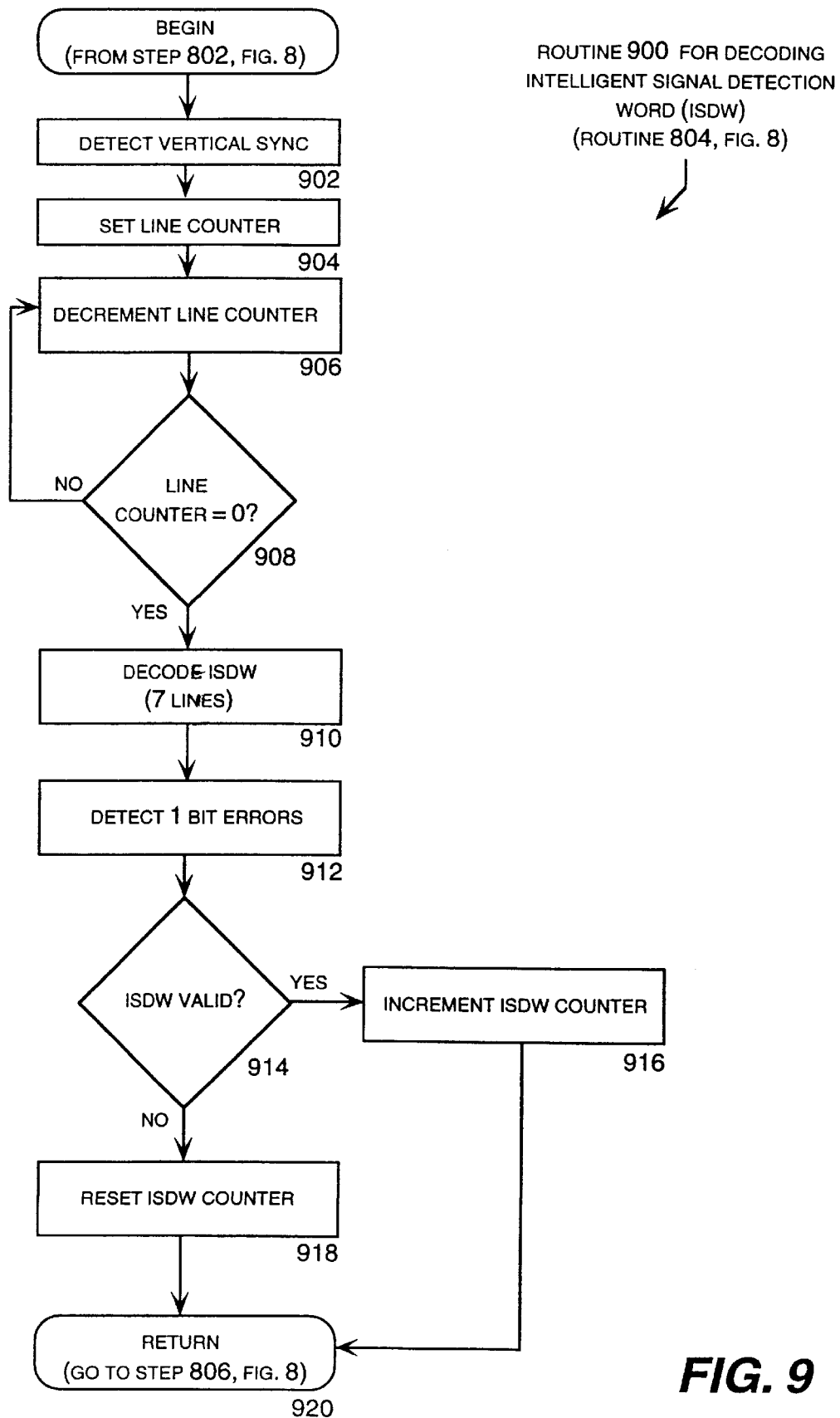
FIG. 9 is a logic flow diagram illustrating a method for decoding an intelligent signal detection word encoded in the horizontal overscan portion of a video signal.

FIG. 9 illustrates a method 900 for decoding an intelligent signal detection word (ISDW) from a single frame of an encoded video signal. At step 902, the detector 48 detects a VSYNC in the video signal. At step 904, the detector 48 sets a line counter equal to the decode constant which describes the number of interstitial video lines from the VSYNC to the first data carrying line. The detector 48, therefore, uses the line counter to keep track of the number of horizontal lines that it has detected since the VSYNC, so that it can begin decoding data on the correct horizontal line.

From step 904, the method continues to step 906 where the detector 48 detects a horizontal reference pulse (H-REF) and decrements the line counter. At step 908, the detector 48 determines whether the line counter is equal to zero. If the line counter is not equal to zero, the "NO" branch is followed to step 906. If the line counter is equal to zero, the predetermined number of horizontal video lines have been detected and the detector 48 can begin decoding the bits of the ISDW.

If the line counter is equal to zero, the "YES" branch is followed to step 910, where the detector 48 decodes the bits of the ISDW. As described above, the ISDW contains four data bits and three error correction bits. At step 910, therefore, the detector 48 decodes the seven bits of the ISDW from seven consecutive horizontal video lines. The detector 48 uses the decode constant, which describes the time, in micro-seconds, between the H-REF and the data sampling point, Ts 80, to determine when to sample the video signal. At step 912, the detector 48 detects and corrects any one bit errors in the ISDW using the seven bit Hamming code described above.

From step 912, the method continues at step 914, where the detector 48 determines whether the ISDW is valid. As described above, a consecutive series of ISDWs defines a dynamic validation sequence 112 in which each ISDW varies in at least two bits from the immediately preceding ISDW. For example, the dynamic validation sequence may be the binary representation of 8, 1, 10, 3, 12, 5, 14, 7. Therefore, the detector 48 determines whether the decoded ISDW conforms to this sequence. If the ISDW conforms to the validation sequence, the "YES" branch is followed to step 916, where the detector 48 increments the ISDW counter. If the ISDW does not conform to the sequence, the "NO" branch. is followed to step 918, where the detector 48 resets the ISDW counter to zero. At step 920, the method 900 returns to step 806, FIG. 8.

Figure 10:
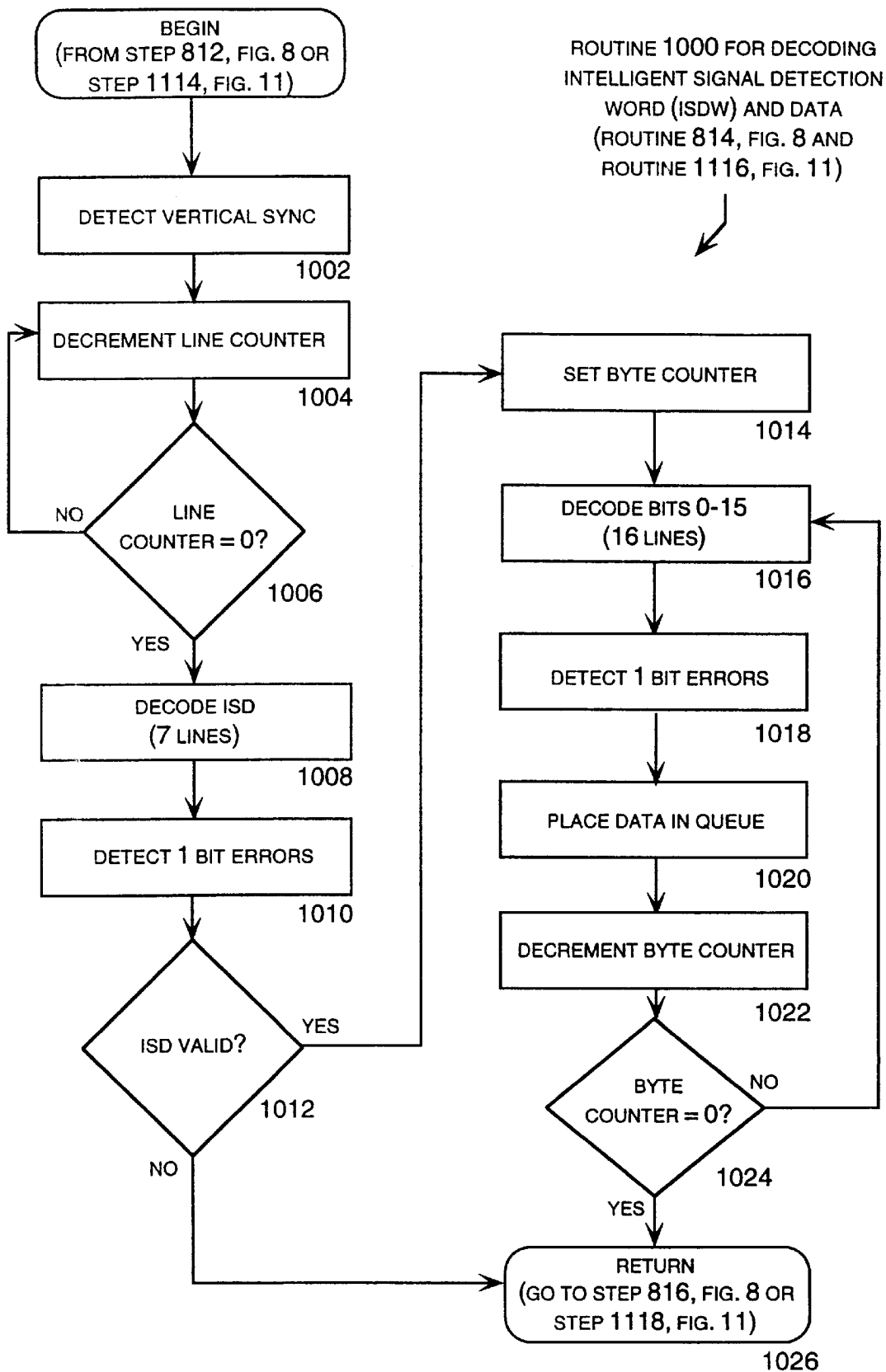
FIG. 10 is a logic flow diagram illustrating a method for decoding an intelligent signal detection word and data encoded in the horizontal overscan portion of a video signal.

FIG. 10 shows the method 1000 for decoding an ISDW and data from a frame of the video signal. At step 1002, the detector 48 detects a VSYNC in the video signal and sets a line counter equal to the decode constant which describes the number of interstitial video lines from the VSYNC to the line carrying the first bit of the ISDW. The detector 48, therefore, uses the line counter to keep track of the number of horizontal lines that it has detected since the VSYNC, so that it can begin decoding the ISDW on the correct horizontal line.

Step 1002 continues to step 1004, where the detector 48 detects H-REF and decrements the line counter. At step 1006, the detector 48 determines whether the line counter is equal to zero. If the line counter is not equal to zero, the "NO" branch is followed to step 1004. If the line counter is equal to zero, the "YES" branch is followed to step 1008, where the detector 48 decodes the bits of the ISDW. As described above, the ISDW contains four data bits and three error correction bits. Therefore, the detector 48 decodes the seven bits of the ISDW from seven consecutive horizontal video lines. The detector 48 uses the decode constant which describes the time, in micro-seconds, between the H-REF and the data sampling point, Ts 80, to determine when to sample the video signal. At step 1010, the detector 48 detects and corrects any one bit errors in the ISDW using the seven bit Hamming code described above.

From step 1010, the method continues to step 1012 where the detector 48 determines whether the ISDW is valid As described above, a consecutive series of ISDWs defines a dynamic validation sequence 112 in which each ISDW varies in at least two bits from the immediately preceding ISDW. Therefore, the detector 48 determines whether the decoded ISDW conforms to the validation sequence. If the ISDW does not conform to the validation sequence, the "NO" branch is followed to step 1026 where the method 1000 returns to step 816, FIG. 8. If the ISDW conforms to the validation sequence, the "YES" branch is followed to step 1014, where the detector 48 sets a byte counter equal to the decode constant which describes the number of 16 bit data words to decode per video field.

Step 1014 continues to step 1016, where the detector 48 decodes 16 bits from 16 horizontal lines of the video signal. As described above with respect to FIG. 7, each 16-bit data word contains 9 data bits and 7 error correction bits. At step 1018, the detector 48 uses the error correction bits contained in the data word to detect and correct any 1 bit errors. At step 1020, the data detector 48 places the decoded data into a queue, such as data buffer 58, for use by the protocol handler 52, the DDM data encoder 54, and the RF transmitter 56. At step 1022, the detector 48 decrements the byte counter. At step 1024, the detector 48 determines whether the byte counter is equal to zero. If the byte counter is equal to zero, the detector 48 has decoded all of the 16 bit data words in the video frame and the "YES" branch is taken to step 816, FIG. 8. If the byte counter is not equal to zero, additional data words remain to be decoded in the video frame, and the "NO" branch is followed to step 1016.

Figure 11:
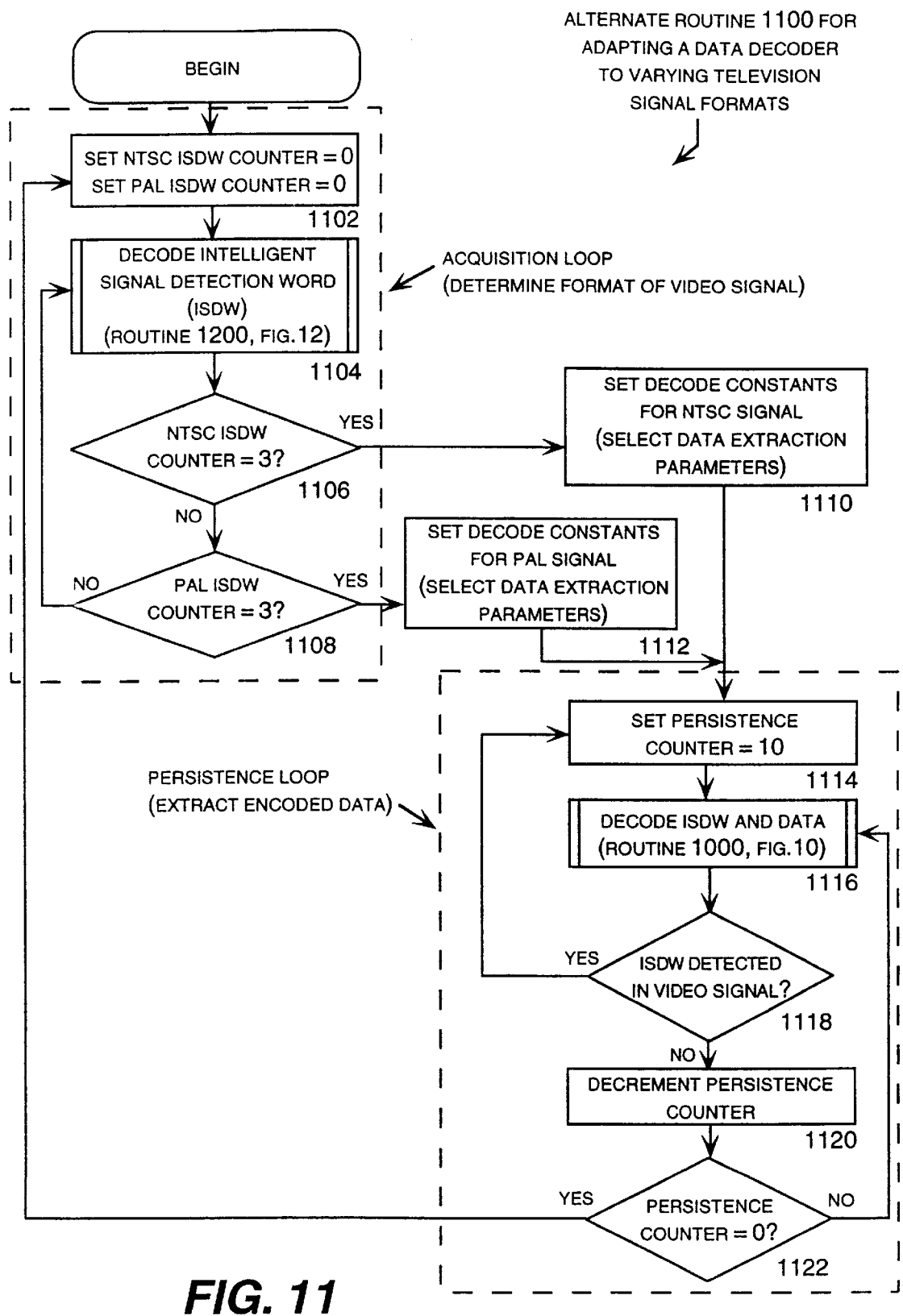
FIG. 11 is a logic flow diagram illustrating a second method of operation for a video data detector adapted to decode multiple television signal formats.

FIG. 11 illustrates an alternate method 1100 for adapting a data detector to varying television signal formats. At step 1102, the detector 48 sets an NTSC ISDW counter and a PAL ISDW counter to zero. The detector 48 uses these counters to count the number of consecutive ISDWs decoded while in a given configuration. At step 1104, the detector 48 attempts to decode an NTSC and a PAL ISDW from the same video frame. The method 1200 for decoding an NTSC and a PAL ISDW from the same video frame is discussed below with reference to FIG. 12.

Step 1104 continues to step 1106, where the detector 48 determines, whether the NTSC ISDW counter is equal to three. If the NTSC ISDW counters is equal to three, the detector 48 has decoded three consecutive valid ISDWs from three consecutive video frames while configured for an NTSC signal. Therefore, if the NTSC ISDW counter is equal to three, the "YES" branch is followed to step 1110, where the detector is configured for an NTSC signal using the decode constants. From step 1110, the method continues to step 1114, described below. Again referring to step 1106, if the NTSC ISDW counter is not equal to three, the "NO" branch is taken to step 1108, where the detector 48 determines whether the PAL ISDW counter is equal to three. If the PAL ISDW counter is equal to three, the detector 48 has decoded three consecutive valid ISDWs from three consecutive video frames while configured for a PAL signal, and the "YES" branch is taken to step 1112. Otherwise, the "NO" branch is followed to step 1104. At step 1112, the detector 48 is configured for a PAL signal using the PAL decode constants.

From steps 1112 and 1110, the method continues to step 1114 where the detector 48 sets a persistence counter to ten. The detector 48 uses the persistence counter to count the number of consecutive video frames from which it is unable to decode a valid ISDW. If the detector 48 is unable to decode valid ISDWs from ten consecutive frames, the detector 48 reenters the acquisition mode described above. At step 1116, the detector 48 decodes the ISDW and data words from a frame of the video signal. The method 1000 for decoding an ISDW and data from a frame of the video signal is discussed above with reference to FIG. 10.

At step 1118, the detector 48 determines whether it decoded a valid ISDW from the frame. If the detector 48 decoded a valid ISDW, the "YES" branch is taken to step 1114, where the persistence counter is reset to 10. If the detector 48 did not decode a valid ISDW, the "NO" branch is taken to step 1120, where the detector 48 decrements the persistence counter. At step 1122, the detector 48 determines whether the persistence counter is equal to zero. If the persistence counter is not equal to zero, the "NO" branch is taken to step 1116, where the detector 48 decodes an ISDW and data from a frame of the video signal. If the persistence counter is equal to zero, the "YES" branch is taken to step 1102, where the method 1100 begins again.

Figure 12:
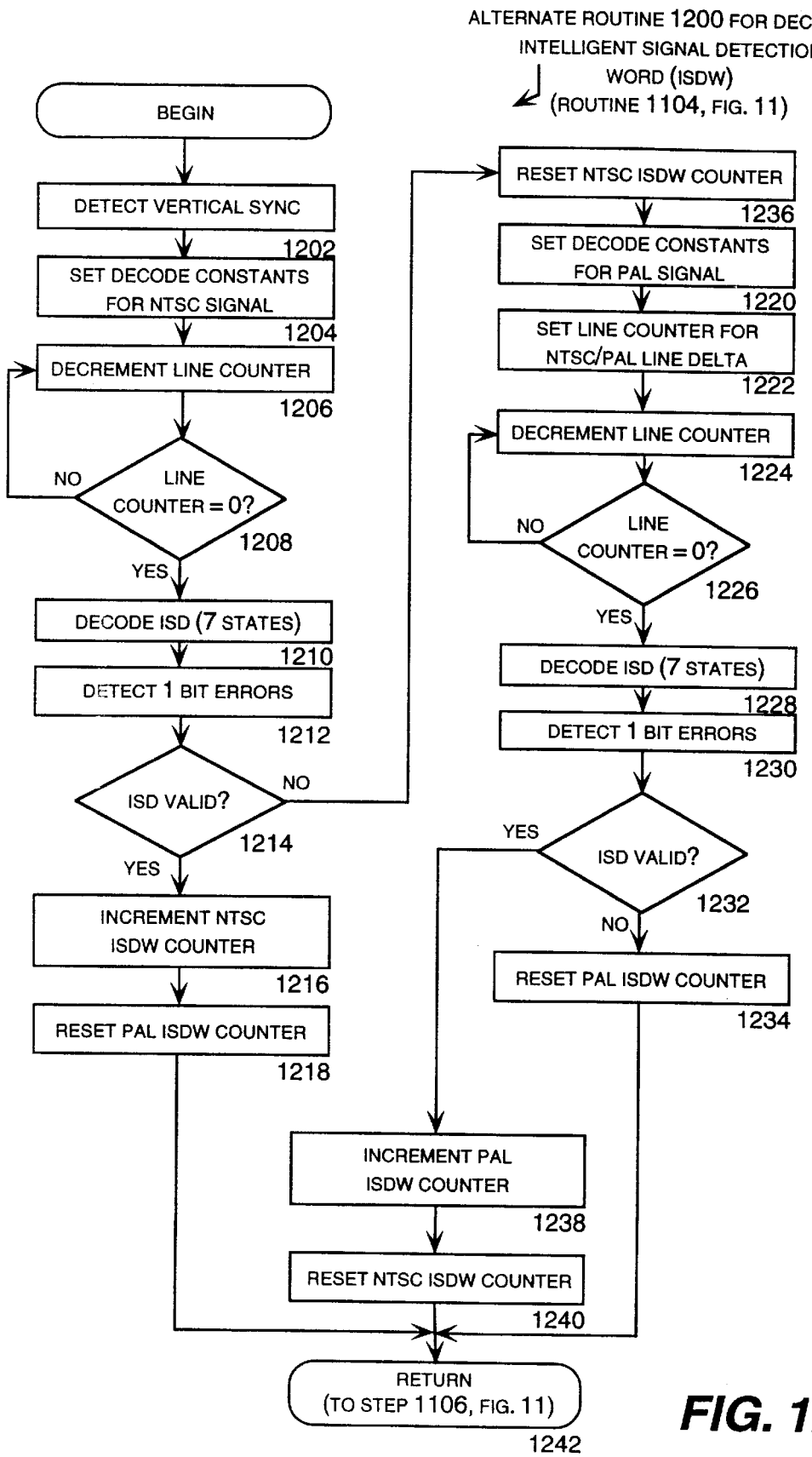
FIG. 12 is a logic flow diagram illustrating a second method for decoding an intelligent signal detection word encoded in the horizontal overscan portion of a video signal.

FIG. 12 shows a method 1200 for decoding an NTSC ISDW and a PAL ISDW from a single frame of a video signal. At step 1202, the detector 48 detects a VSYNC in the video signal. At step 1204, the detector 48 is configured for an NTSC signal using the NTSC decode constants described above. At step 1206, the detector 48 decrements the line counter. At step 1208, the detector 48 determines whether the line counter is equal to zero. If the line counter is not equal to zero, the "NO" branch is taken to step 1206. If the line counter is equal to zero, the "YES" branch is taken to step 1210, where the detector 48 decodes the seven bits of the NTSC ISDW from seven consecutive horizontal lines of the video signal.

Step 1210 continues to step 1212, where the detector 48 detects and corrects and one bit errors in the ISDW. At step 1214, the detector 48 determines whether the ISDW is valid. If the ISDW is not valid, the "NO" branch is taken to step 1220. If the ISDW is valid, the "YES" branch is followed to step 1216, where the detector increments the NTSC ISDW counter. At step 1218, the detector 48 resets the PAL ISDW counter to zero. At step 1242, the method, 1200 returns to step 1106, FIG. 11.

The "NO" branch from step 1214 continues to step 1236, where the detector 48 reset the NTSC ISDW counter to zero. Step 1236 proceeds to step 1220, where the detector 48 is configured for a PAL signal using the PAL decode constants described above. At step 1222, the detector 48 sets the line counter to the number of additional lines necessary to count to arrive at the first horizontal line of the PAL ISDW (the NTSC/PAL line delta, minus seven lines occupied by the NTSC ISDW). At step 1224, the detector 48 decrements the line counter. At step 1226, the detector 48 determines whether the line counter is equal to zero. If the line counter is not equal to zero, the "NO" branch is followed to step 1224. If the line counter is equal to zero, the "YES" branch is taken to step 1228, where the detector 48 decodes the seven bits of the PAL ISDW from seven consecutive horizontal lines of the video signal.

Step 1228 continues to step 1230, where the detector 48 detects and corrects and one bit errors in the PAL ISDW. At step 1232, the detector 48 determines whether the ISDW is valid. If the ISDW is valid, the "YES" branch is followed to steps 1238 and 1240, where the detector increments the PAL ISDW counter and resets the NTSC ISDW counter. If the ISDW is not valid, the "NO" branch is taken to step 1234, where the detector 48 resets the PAL ISDW counter to zero. At step 1242, the method 1200 returns to step 1106, FIG. 11.

In view of the foregoing, it will be appreciated that the present invention provides a method and system for decoding data encoded in the horizontal overscan portion of a video signal independent of the transmission format of the video signal. It should be understood that the foregoing relates only to specific embodiments of the invention, and that numerous changes may be made therein without departing from the spirit and scope of the invention as defined by the following claims.

What is claimed is:

1. A method for decoding data encoded in a video signal, comprising the steps of:
   receiving a video signal;
   determining the format of the video signal;
   selecting data extraction parameters based on the format of the video signal;
   extracting data encoded in the video signal using the selected data extraction parameters.

2. The method of claim 1, wherein the step of determining the format of the video signal comprises:
   counting the number of horizontal lines defining a frame of the video signal;
   comparing the number of counted lines to the number of lines contained in known video signal formats; and
   determining the format of the video signal based upon the result of the comparison.

3. The method of claim 1, wherein the step of determining the video signal format comprises:
   determining the length of a horizontal line contained in a frame of the video signal;
   comparing the length of the horizontal line to the length of horizontal lines in known video signal formats; and
   determining the format of the video signal based upon the result of the comparison.

4. The method of claim 1, wherein the step of determining the format of the video signal comprises:
   searching for data encoded in the video signal at a first expected location;
   determining whether data was found at the first location;
   in response to finding that data was not found at the first location, searching for data encoded in the video signal at a second expected location; and
   determining whether data was found at the second location.

5. The method of claim 4, wherein the step of selecting data extraction parameters based on the type of video signal format comprises:
   selecting a first set of decode constants corresponding to a first video format in response to finding data at the first location; and
   selecting a second set of decode constants corresponding to a second video format in response to finding data at the second location.

6. The method of claim 1, wherein the step of determining the format of the video signal comprises:
   configuring a data detector to decode data encoded in a first video signal format by setting decode constants to correspond to the first video signal format;
   decoding data encoded in the video signal using the decode constants;
   determining whether a plurality of consecutive valid data words were decoded from consecutive frames of the video signal;
   in response to determining that a plurality of consecutive data words were not decoded, reconfiguring the data detector to decode data encoded in a second video signal format by setting the decode constants to correspond to the second video signal format;
   decoding data words encoded in the video signal using the decode constants; and
   determining whether a plurality of consecutive data words were decoded from consecutive frames of the video signal using the second decode constants.

7. The method of claim 6, wherein the step of extracting data encoded in the video signal using the selected data extraction parameters comprises:
   decoding data encoded in the video signal until a plurality of data words cannot be decoded from a plurality of consecutive video frames;
   determining whether the data detector is configured to decode data encoded in the first or second video signal format;
   in response to determining that the data detector is configured for the first video signal format, reconfiguring the data detector to decode data encoded in the second video signal format by setting decode constants for the second video signal format; and
   repeating from the step of determining the format of the video signal.

8. The method of claim 1, wherein the step of determining the format of the video signal comprises:
   searching for data encoded in a frame of the video signal at a first expected location;
   determining whether data was found at the first location;
   in response to finding that data was not found at the first location, searching for data encoded in the frame of the video signal at a second expected location;

determining whether data was found at the second location; and repeating from the first searching step until data is found at the first or second expected locations in a plurality of consecutive frames of the video signal.

9. An apparatus for decoding data encoded in a video signal, comprising:

means for determining the transmission format of the video signal;

means for extracting data encoded in the video signal based on the transmission format of the video signal; and means for transmitting the decoded data to a device.

10. A computer-controlled apparatus for implementing the method of claim 1.

11. A computer-controlled apparatus for implementing the method of claim 7.

12. A method for decoding data encoded in a video signal, comprising the steps of:

entering an acquisition loop to determine the format of the video signal;

remaining in the acquisition loop until the format of the video signal is detected;

based upon the detected format of the video signal, setting data extraction parameters;

entering a persistence loop to extract data encoded in the video signal using the data extraction parameters;

remaining in the persistence loop until data is not decoded from a plurality of frames of the video signal using the data extraction parameters; and when data is not decoded from a plurality of frames, reentering the acquisition loop.

13. The method of claim 12, wherein the step of remaining in the acquisition loop comprises:

searching for data encoded in a frame of the video signal at a first expected location;

determining whether data was found at the first location;

in response to finding that data was not found at the first location, searching for data encoded in another frame of the video signal at a second expected location;

determining whether data was found at the second location; and repeating from the first searching step until data is found at the first or second expected locations in a plurality of consecutive frames of the video signal.

14. A method for decoding data encoded in a video signal, comprising the steps of:

configuring a data decoder to decode data encoded in a first video signal format by setting decode constants to correspond to a first video signal format;

receiving a video signal;

decoding intelligent signal detection words encoded in the video signal using the decode constants;

determining whether a plurality of consecutive valid intelligent signal detection words were decoded from consecutive frames of the video signal;

in response to determining that a plurality of consecutive intelligent signal detection words were not decoded, reconfiguring the data decoder to decode data encoded in a second video signal format by setting decode constants to correspond to a second video signal format;

decoding intelligent signal detection words encoded in the video signal using the decode constants;

determining whether a plurality of consecutive intelligent signal detection words were decoded from consecutive frames of the video signal; and in response to determining that a plurality of consecutive intelligent signal detection words were not decoded, repeating from the configuring step.

15. The method of claim 14, further comprising the steps of:

in response to determining that a plurality of consecutive intelligent signal detection words were decoded, decoding intelligent signal detection words and data encoded in the video signal until a plurality of intelligent signal detection words cannot be decoded from a plurality of consecutive video frames; and in response to determining that a plurality of intelligent signal detection words cannot be decoded from the plurality of consecutive video frames, determining whether the data decoder is configured to decode data in the first or second video format and, in response to determining that the data decoder is configured for the first video signal format, reconfiguring the data decoder to decode data encoded in the second video signal format by setting decode constants to correspond to the second video signal format, and repeating from the second decoding step.

16. The method of claim 14, further comprising the steps of:

in response to determining that a plurality of consecutive intelligent signal detection words were decoded, decoding intelligent signal detection words and data encoded in the video signal until a plurality of intelligent signal detection words cannot be decoded from a plurality of consecutive video frames; and in response to determining that a plurality of intelligent signal detection words cannot be decoded from a plurality of consecutive video frames, repeating from the second decoding step.

17. The method of claim 15, further comprising the steps of:

in response to determining that the data decoder is configured for the second video signal format, reconfiguring the data decoder to decode data encoded in the first video signal format by setting decode constants to correspond to the first video signal format, and repeating from the first decoding step.

18. A method for decoding data encoded in a video signal, comprising the steps of:

configuring a data decoder to decode data encoded in a first video signal format by setting decode constants to correspond to a first video signal format;

receiving a video signal;

decoding an intelligent signal detection word encoded in a frame of the video signal using the decode constants;

determining whether a valid intelligent signal detection word was decoded from the frame of the video signal;

in response to determining that a valid intelligent signal detection word was not decoded, reconfiguring the data decoder to decode data encoded in a second video signal format by setting decode constants to correspond to a second video signal format;

decoding an intelligent signal detection word encoded in the frame of the video signal using the decode constants;

repeating from the configuring step until a plurality of consecutive valid intelligent signal detection words are decoded from a like plurality of consecutive frames of the video signal using corresponding decode constants.

19. The method of claim 18, further comprising the steps of:

in response to decoding a plurality of consecutive valid intelligent signal detection words are decoded from a plurality of consecutive frames of the video signal using corresponding decode constants, decoding intelligent signal detection words and data encoded in the video signal until a plurality of intelligent signal detection words cannot be decoded in a plurality of video frames of the video signal and repeating from the configuring step.

* * * * *